United States Patent
Hajjar et al.

(10) Patent No.: US 9,121,577 B2
(45) Date of Patent: Sep. 1, 2015

(54) DISPLAYS HAVING BUILT-IN MOÍRE REDUCTION STRUCTURES

(75) Inventors: Roger A. Hajjar, San Jose, CA (US); Jahja Trisnadi, Cupertino, CA (US)

(73) Assignee: Prysm, Inc., San Jose, CA (US)

( * ) Notice: Subject to any disclaimer, the term of this patent is extended or adjusted under 35 U.S.C. 154(b) by 94 days.

(21) Appl. No.: 13/823,928

(22) PCT Filed: Apr. 13, 2012

(86) PCT No.: PCT/US2012/033615
§ 371 (c)(1),
(2), (4) Date: Mar. 15, 2013

(87) PCT Pub. No.: WO2012/142478
PCT Pub. Date: Oct. 18, 2012

(65) Prior Publication Data
US 2013/0176725 A1    Jul. 11, 2013

Related U.S. Application Data

(60) Provisional application No. 61/476,226, filed on Apr. 15, 2011, provisional application No. 61/529,893, filed on Aug. 31, 2011.

(51) Int. Cl.
*G03B 21/60* (2014.01)
*H04N 9/31* (2006.01)
(Continued)

(52) U.S. Cl.
CPC . *F21V 9/10* (2013.01); *G03B 21/60* (2013.01); *H04N 9/3129* (2013.01); *G03B 21/2033* (2013.01); *G03B 33/06* (2013.01)

(58) Field of Classification Search
CPC .......... H04N 9/3129; H04N 9/31; F21V 9/10; G03B 21/60

USPC .......................... 359/449, 460, 443
See application file for complete search history.

(56) References Cited

U.S. PATENT DOCUMENTS 3,378,636 A    4/1968    Hamilton
4,633,293 A *  12/1986   Powers ........................ 348/441
(Continued)

FOREIGN PATENT DOCUMENTS

EP    1411732 A2    4/2004
EP    1632809       3/2006
(Continued)

OTHER PUBLICATIONS

International Preliminary Report on Patentability in International Application No. PCT/US2012/033615, mailed Oct. 24, 2013, 9 pages.
(Continued)

*Primary Examiner* — Christ Mahoney
(74) *Attorney, Agent, or Firm* — Fish & Richardson P.C.

(57) ABSTRACT

Techniques and display devices that provide a built-in Moire reduction structure in a display screen are disclosed. The built-in Moire reduction structure is configured to suppress spatial frequencies that are associated with the sub-pixel level periodicities in the light emitted by the colored sub-pixels of the display screen, and hence, reduce the Moire patterns that might otherwise be produced when images presented on the display screen are captured by a digital image capturing device having a periodic light-sensing structure. The built-in Moire reduction structure is a blur layer placed on the viewer side of the screen and separated by a spacer layer from the pixel layer of the display screen. The blurring power of the blur layer is controlled to substantially preserve the pixel-level resolution of the display screen.

32 Claims, 15 Drawing Sheets

(51) Int. Cl.
  *F21V 9/10* (2006.01)
  *G03B 21/20* (2006.01)
  *G03B 33/06* (2006.01)

(56) References Cited

U.S. PATENT DOCUMENTS

| | | | |
|---|---|---|---|
| 4,804,253 A | | 2/1989 | Stewart |
| 6,147,732 A | * | 11/2000 | Aoyama et al. ............... 349/112 |
| 6,268,960 B1 | | 7/2001 | Hirota et al. |
| 8,063,920 B2 | * | 11/2011 | De Haan et al. ............. 345/690 |
| 2005/0073472 A1 | | 4/2005 | Kim et al. |
| 2006/0221021 A1 | | 10/2006 | Hajjar et al. |
| 2009/0079662 A1 | | 3/2009 | Takada et al. |

FOREIGN PATENT DOCUMENTS

| | | |
|---|---|---|
| JP | 8327496 A | 12/1996 |
| JP | 11006786 A | 1/1999 |
| JP | 2001-042310 | 2/2001 |
| WO | WO03/079094 A2 | 9/2003 |

OTHER PUBLICATIONS

Prysm, Inc., International Search Report and Written Opinion, PCT/US2012/033615, Aug. 29, 2012, 11 pgs.

* cited by examiner

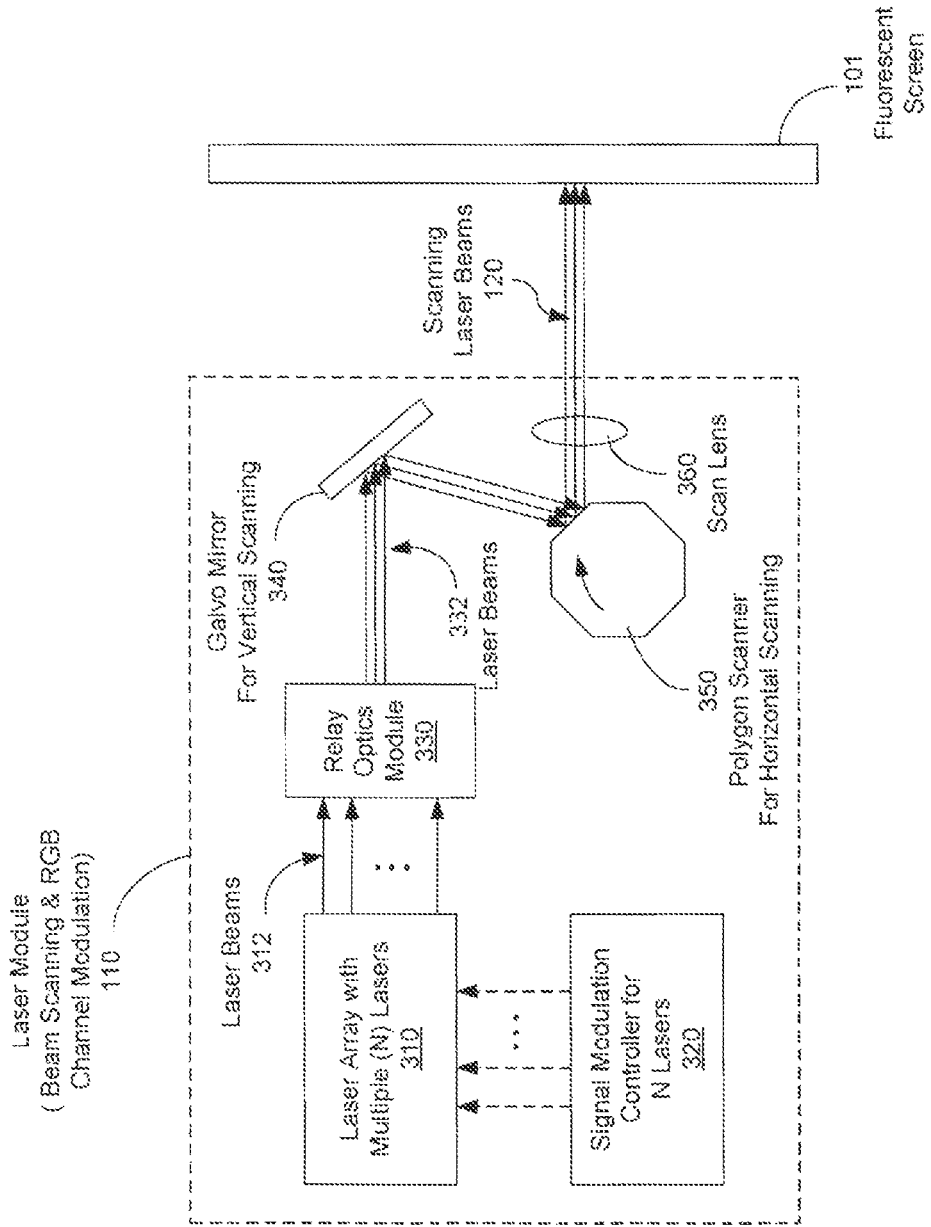

DISPLAYS HAVING BUILT-IN MOIRÉ REDUCTION STRUCTURES

CROSS REFERENCE TO RELATED APPLICATIONS

This application is a United States National Stage application filed under 35 U.S.C. §371 of PCT Patent Application Serial No. PCT/US2012/033615, titled "DISPLAYS HAVING BUILT-IN MOIRÉ REDUCTION STRUCTURES," filed Apr. 13, 2012, which claims under 35 U.S.C. §119(e) the benefit of U.S. Provisional Application No. 61/476,226, titled "DISPLAYS HAVING BUILT-IN MOIRÉ REDUCTION STRUCTURES," filed on Apr. 15, 2011, and U.S. Provisional Application No. 61/529,893, titled "DISPLAYS HAVING BUILT-IN MOIRÉ REDUCTION STRUCTURES," filed on Aug. 31, 2011, the entire contents of which is in corporate by reference herein.

BACKGROUND

This patent document relates to display screens and display devices.

Many image and video displays are designed to produce colored images using arrays of light-emitting pixels physically present or visually formed on a screen. Each pixel can include a set of colored sub-pixels that each emits visible light of a respective color (e.g., red, blue, and green). The color composition and brightness of each pixel in an image can be controlled by the respective brightness of each colored sub-pixel of that pixel.

A viewer or an image capturing device can perceive or capture the image as a whole when the light emitted by all sub-pixels on the display during an image frame arrives at the viewer's eyes or the light-sensing structures of the image capturing device. In a digital image capturing device (e.g., a digital still camera or video camera), the light-sensing structures include photo-sensors distributed in one or more periodic arrays, and each photo-sensor is capable of detect light signals received at its respective location. The output image produced by the digital image capturing device is a composite of the light signals detected by all of photo-sensors in the one or more periodic arrays during one image frame.

Moiré patterns are interference patterns (e.g., alternating light and dark fringes) created, for example, when the two grids having slightly different mesh shapes, sizes, and/or pitches are overlaid on each other, or when two identical grids are overlaid at an angle. Moiré patterns often occur in images produced by various digital imaging and computer-graphics techniques, for example, when scanning a halftone picture or ray tracing a checkered plane. Sometimes, Moiré patterns also occur in digital images that capture objects having periodic structures, such as a wire mesh, a striped or checkered shirt, a cage, and so on. Moiré patterns that are present in digital images are often artifacts produced due to the discrete and periodic image capturing or processing characteristics of the imaging capturing device. Techniques for reducing Moiré patterns that occur in various types of situations are desirable for improving image quality.

SUMMARY

This specification describes display devices that have built-in structures for reducing Moiré patterns that may be produced when images presented on the display devices are captured by a digital image capturing device.

When a digital image capturing device is used to capture an image presented on a display device, Moiré patterns may be produced in the output image of the digital image capturing device, due to the interference between the periodic light-emitting structures (e.g., periodic arrays of colored light-emitting pixels and/or sub-pixels) in the display device and the periodic light-sensing structures (e.g., periodic arrays of photo-sensors) in the image capturing device.

As described in this specification, a blur layer or "a blurring layer" can be provided in a display device adjacent to a pixel layer of the display device, on the viewer side of the display screen. The pixel layer of the display device is a layer of the display screen in which boundaries of light-emitting pixel elements and/or sub-pixel elements are defined. The blur layer is configured to selectively and substantially suppress the spatial frequencies in a displayed image that are associated with the periodicities of sub-pixel level features (e.g., boundaries of the colored sub-pixels, boundaries and/or gaps between light-emitting elements, or boundaries and/or gaps between light-transmitting elements), while substantially preserving the pixels-level spatial resolution of the image.

When a display screen includes a blur layer as described in this specification and a digital image capturing device receives the light emitted by the colored sub-pixel elements of the display screen through the blurring layer, visibility of Moiré patterns in the output image produced by the digital image capturing device can be significantly reduced, as compared to the case where no such blur layer is implemented in the display screen. The reduction of the Moiré patterns is due to the elimination of the sub-pixel level spatial periodicities in the light emitted by pixel layer of the display device. Essentially, when a component of the interference that produces the Moiré patterns is suppressed or eliminated, the Moiré patterns are also suppressed or eliminated.

Sometimes, when digital image capturing devices are used to capture images produced by a digital display device (e.g., in a broadcast scenario), it is desirable to have a display device that absorbs rather than reflect ambient light. In some implementations, the blur layer used for Moiré reduction can be accompanied by additional structures in the display screen that are absorbent to incident to ambient light. These additional structures can reduce the reflections of ambient light incident on the display screen and produce a darker appearance for the display screen.

In one aspect, a display screen includes: a pixel layer comprising a periodic array of light-emitting pixel elements, the periodic array having a pixel pitch of W along at least one direction and operable to emit visible light toward a viewer side of the display; and a blur layer disposed adjacent to the pixel layer on the viewer side of the display relative to the pixel layer, the blur layer configured to diffuse light emitted by the pixel elements in the periodic array of light-emitting pixel elements, and to suppress at least spatial frequencies that are greater than $1/(0.5W)$ and preserve at least spatial frequencies that are less than $1/(6W)$ in images formed by the light emitted by the pixel elements in the periodic array of light-emitting pixel elements.

In some implementations, respective boundaries of the light-emitting pixel elements form spatially periodic linear features having one or more spatial frequencies greater than $1/W$; and the blur layer is configured to suppress at least spatial frequencies that are greater than $1/(1.5W)$ and preserve at least spatial frequencies that are less than $1/(6W)$ in the images formed by the light emitted by the pixel elements in the periodic array of light-emitting pixel elements.

In some implementations, the blur layer is configured to suppress at least spatial frequencies that are greater than 1/(1.5W) and preserve at least spatial frequencies that are less than 1/(2W) in the images formed by the light emitted by the pixel elements in the periodic array of light-emitting pixel elements.

In some implementations, the light-emitting pixel elements each includes a respective set of multiple sub-pixel elements, the respective set of multiple sub-pixel elements each configured to emit light of a respective sub-pixel color, and respective boundaries of the sub-pixel elements of each sub-pixel color in the periodic array form spatially periodic linear features having one or more spatial frequencies greater than 1/W; and the blur layer is configured to suppress at least spatial frequencies that are greater than 1/(0.5W) and preserve at least spatial frequencies that are less than 1/(2W) in the images formed by the light emitted by the pixel elements in the periodic array of light-emitting pixel elements.

In some implementations, the blur layer is configured to suppress at least spatial frequencies that are greater than 1/(0.75W) and preserve at least spatial frequencies that are less than 1/(1.25W) in the images formed by the light emitted by the pixel elements in the periodic array of light-emitting pixel elements.

In some implementations, the blur layer is configured to suppress at least spatial frequencies that are greater than 1/W and preserve at least spatial frequencies that are less than 1/W in images formed by the light emitted by the pixel elements in the periodic array of light-emitting pixel elements.

In some implementations, respective sizes and spatial configuration the spatially periodic linear features are apposite to form Moiré patterns when images presented on the display screen are captured by a periodic light-sensing structure in an image capturing device; and the blur layer in the display screen reduces formation of the Moiré patterns when images presented on the display screen are captured by the periodic light-sensing structure in the image capturing device.

In some implementations, each light-emitting pixel element in the periodic array includes an identical set of multiple sub-pixel elements.

In some implementations, each light-emitting pixel element in the periodic array shares at least one light-emitting sub-pixel element with one or more adjacent light-emitting pixel elements in the pixel layer.

In some implementations, a respective boundary of each sub-pixel element includes at least in part a physical boundary separating a light-emitting region from non-light-emitting region or separating a first light-emitting region of a first color from a second light-emitting region of a second color.

In some implementations, a respective boundary of each light-emitting pixel element comprises at least in part a physical boundary separating a light-emitting region from non-light-emitting region or separating a light-emitting region from non-light-emitting region.

In some implementations, the periodic array of light-emitting pixel elements comprises a plurality of parallel light-emitting stripes each configured to emit light of a respective color and form a respective colored sub-pixel element of the display screen when irradiated by a scanning excitation beam on an excitation side of the pixel layer opposite to the viewer side.

In some implementations, the pixel layer comprises a color filter layer; the color filter layer includes a plurality of parallel, colored filter stripes, each colored filter stripe configured to absorb a respective portion of an emission spectrum of a fluorescent layer adjacent to the color filter stripe and let through light of a respective color to the viewer side of the display screen; and a respective boundary of each light-emitting pixel element is defined at least in part by a respective boundary of one of the plurality of colored filter stripes.

In some implementations, the fluorescent layer comprises a layer of fluorescent material operable to emit broad spectrum light of multiple color components.

In some implementations, the fluorescent layer comprises a layer of parallel, colored fluorescent stripes; and each colored filter stripe and a respective one of the colored fluorescent stripes adjacent to the colored filter stripe form, at least in part, a respective light-emitting pixel element of the pixel layer when irradiated by a scanning excitation beam.

In some implementations, the blur layer comprises a diffusing layer and a spacer layer adjacent to the diffusing layer; the spacer layer is disposed adjacent to the pixel layer on the viewer side of pixel layer and couples light emitted by the light-emitting pixel elements in the pixel layer to the diffusing layer; and the diffusing layer is disposed on a viewer side of the spacer layer and comprises a distribution of curved refractive surfaces that diffuse the light emitted by the light-emitting pixel elements, the distribution of the curved refractive surfaces is substantially uniform across an entire display region of the display screen, and locally non-periodic with respect to at least spatial frequencies greater than 1/(4W).

In some implementations, the distribution of curved refractive surfaces comprises respective surfaces of a plurality of non-periodically distributed glass beads that protrude toward the viewer side of the display screen.

In some implementations, the spacer layer is made of glass and has a thickness of approximately W/2–2W; and the spacer layer is laminated on the pixel layer.

In some implementations, the spacer layer comprises an air gap.

In some implementations, the spacer layer includes at least one solid layer adjacent an air gap layer.

In some implementations, the diffusing layer further comprises a layer of light-absorbing material, and the plurality of non-periodically distributed glass beads each protrudes from the layer of light-absorbing material on both sides of the layer of light absorbing material.

In some implementations, each glass bead has a smaller refractive surface protruding beyond the layer of light-absorbing material toward the viewer side of the display screen and a larger refractive surface protruding beyond the layer of light-absorbing material toward a side of the display screen opposite to the viewer side.

In some implementations, the larger refractive surface comprises a first dome having a base with a diameter of 55-75 microns; the smaller refractive surface comprises a second dome having a base with a diameter of 20-30 microns; and the spacer layer has a thickness of approximately 3 mm.

In some implementations, a neutral density filter disposed on the viewer side of the blur layer.

In one aspect, a display screen includes: a pixel layer comprising a periodic array of pixel elements each having a pixel pitch W, the pixel elements each including an identical set of multiple sub-pixel elements positioned according to an identical layout, the multiple sub-pixel elements each configured to emit light of a distinct sub-pixel color to a viewer side of the display screen, and the sub-pixel elements of each sub-pixel color in the periodic array of pixel elements forming spatially periodic linear features; and a blur layer disposed adjacent to the pixel layer on the viewer side of the display, the blur layer configured to diffuse the light emitted by the sub-pixel elements in the periodic array of pixel elements, and suppress at least spatial frequencies that are greater than 1/(0.5W) and preserve at least spatial frequencies that are less than 1/(2W)

in images formed by the light emitted by the sub-pixel elements in the periodic array of pixel elements.

In one aspect, a display screen, comprising: a pixel layer comprising a plurality of fluorescent elements each configured to emit light of a respective color to a viewer side of the display and to form a respective colored sub-pixel of the display when irradiated by a scanning excitation beam on a first side of the pixel layer opposite to the viewer side of the display, the plurality of fluorescent elements forming identical spatial arrangements of multiple fluorescent elements of different sub-pixel colors, and the multiple fluorescent elements in each spatial arrangement forms a respective pixel of width W; and a blur layer disposed adjacent to the pixel layer on the viewer side of the display, wherein the blur layer diffuses the light emitted by the plurality of fluorescent elements, and a blurring power of the blur layer is approximated by a point spread function (PSF) having a PSF width between 0.5W-2W, and wherein the blur layer blurs boundaries between adjacent different colored sub-pixels and reduces formation of Moiré patterns when images presented on the display screen are captured by a periodic light-sensing structure in an image capturing device.

In one aspect, a display screen, includes a pixel layer comprising a plurality of parallel fluorescent stripes, each fluorescent stripe configured to emit light of a respective color to a viewer side of the display and to convey image information in a respective colored sub-pixel when irradiated by a scanning excitation beam on a first side of the pixel layer opposite to the viewer side of the display, the plurality of fluorescent stripes being arranged in identical sequences of multiple stripes of different colors, the respective colored sub-pixels provided by the multiple stripes in each sequence constituting a respective pixel of the display when the scanning excitation beam scans across the multiple stripes, and each pixel of the display having a pixel width of W; and a blur layer disposed adjacent to the pixel layer on the viewer side of the display, wherein the blur layer diffuses the light emitted by the plurality of florescent stripes to blur boundaries between adjacent, different colored sub-pixels, while preserving pixel-level resolution of an image conveyed by the pixels of the display screen.

Particular implementations of the subject matter described in this specification can be implemented to realize one or more of the following advantages.

The suppression of sub-pixel level periodicities in the light emitted from the pixel layer of the display screen using a blur layer adjacent to the pixel layer of the display screen can significantly reduce Moiré pattern formation for all types of digital image capturing devices. A Moiré reduction structure is not required on the digital image capturing devices, but rather is built-in onboard the display device. The Moiré reduction can be accomplished for all zoom levels and image capturing resolutions without the need to use different filters for different zoom levels, image capturing resolutions, or camera types. Displays with the built-in Moiré reduction structures can be particularly advantageous in broadcast situations, where a wide variety of image capturing devices operating under a wide range of imaging conditions are used to capture images presented on the displays, and not all of the image capturing devices are suitably equipped with their own filters for the particular zoom levels that are desired in the broadcast situation. In addition, the Moiré reduction is accomplished through display design and requires no special skills from the users of the image capturing devices for selecting and manipulating special filters for their respective image capturing devices.

In addition, the built-in structures for absorbing/attenuating the ambient light incident on the display screen (a so-called "dark-screen layer") can reduce the reflection of the ambient light into the image capturing devices. In a broadcast scenario, various lighting effects are used to suit different shooting purposes. The "dark-screen" layer built into the display screen can attenuate the visual artifacts produced on the display screen by these different lighting effects, and prevent the visual artifacts from being captured by the image capturing devices. Furthermore, the "dark-screen" layer provides a dark background for the active pixels on the display, producing more vivid contrast in the displayed images. When the display is inactive, the "dark-screen" layer in the display can provide a dark and uniform background, rather than produce glares and reflections due to ambient lighting.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 shows an example implementation of the laser module in FIG. 1 having multiple lasers that direct multiple laser beams on the screen.

DETAILED DESCRIPTION

Figure 1:
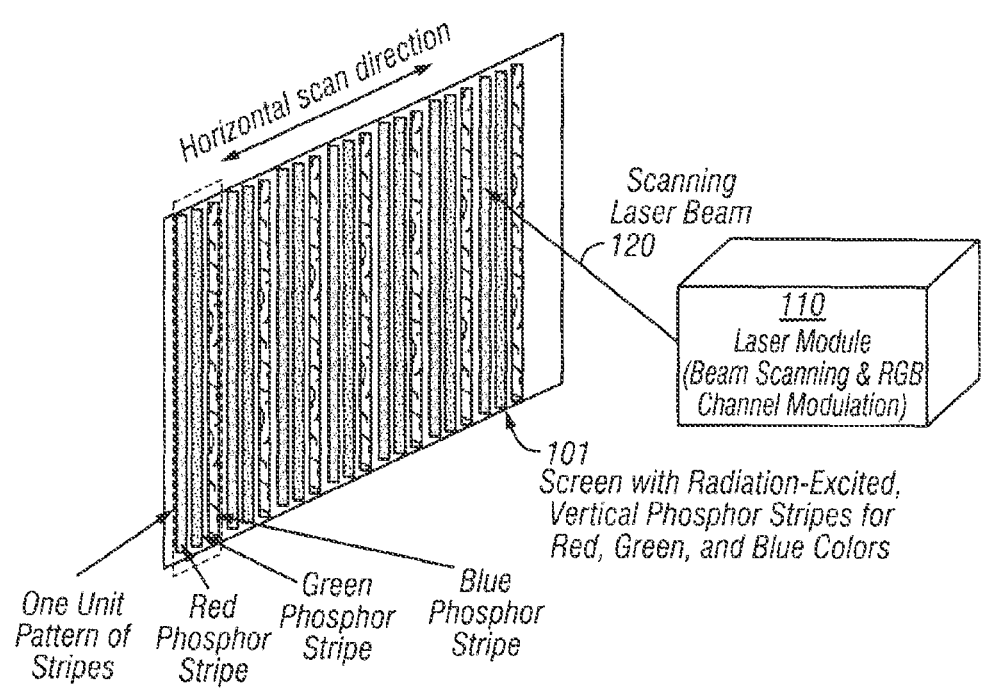
FIG. 1 shows an example scanning laser display system having a fluorescent screen.

When a digital image capturing device, such as a digital camera or digital video camera, is used to capture an image presented on a display screen, artifacts in the form of alternating dark and light stripes, grids, or wavy fringes, in other words, "Moiré patterns," can often be seen in the output image produced by the digital image capturing device.

Sometimes, these artifacts are formed when the images presented on the display screen inherently include periodic lines or grids, such as images showing a striped or checkered shirt, a wire mesh cage, or a drawing with cross-hatched shadings is presented on the display screen. These periodic lines or grids in the image can interfere with the periodic light-sensing structures (e.g., photo-sensor arrays) in the digital image capturing device, causing Moiré patterns to appear in the output image produced by the digital image capturing device.

Sometimes, Moiré patterns can be formed in the output image of a digital image capturing device even if the images presented on the display screen do not inherently include periodic lines or grids. In such scenarios, the Moiré patterns can be a result of the interplay between the periodic arrangement of the light-sensing structures in the image capturing device and the periodic arrangement of sub-pixel level features (e.g., the closely spaced, parallel, linear arrays of alternating red, blue, and green sub-pixels, or non-light-emitting borders around the pixels or sub-pixels) in the display.

For example, the Moiré patterns in the output image of the digital image capturing device can result from the interference between a first spatial periodicity existing in the light-sensing structures in the digital image capturing device and a second spatial periodicity existing in the light arriving at the periodic light-sensing structures in the digital image capturing device. When the resolving power of the digital image capturing device is sufficient to resolve the boundaries between the sub-pixels in the display screen, the spatial periodicities of the sub-pixels can interfere with the periodic photo-arrays of the digital image capturing device to produce visible Moiré patterns in the output image of the digital image capturing device. The Moiré patterns can be most prominent when the spatial periodicities of the light-emitting sub-pixels under particular imaging conditions (e.g., zoom levels, and focal lengths of the image capturing device) appear comparable in size relative to the spatial periodicities of the light-sensing photo-arrays. This specification describes display screens with built-in structures configured to reduce the occurrence of this type of Moiré patterns in the output images produced by digital image capturing devices.

For another example, for some displays (e.g., in an LED display wall), the pixel pitch W (e.g., the distance between the centers of adjacent pixels along a horizontal, vertical, or other pixel lattice direction) of the display screen is larger (e.g., 1.2 times to 3 times larger) than the physical dimensions of the light-emitting pixel elements in the display, the boundaries of the pixel elements will also produce sub-pixel level spatial periodicities that can interfere with the periodic light-sensing structures in the digital image capturing device, and create Moiré patterns in the output images of the digital image capturing device. The built-in Moiré reduction structures described in this specification can also be effective in reducing this type of Moiré patterns by choosing an appropriate blurring layer that suppresses and preserves the appropriate spatial frequency bands in the light emitting by the pixel elements of the display screen.

Some anti-Moiré filters are currently available for use with digital image capturing devices. These filters can be affixed to the front of the image capturing device to eliminate some of the spatial periodicities in the light that enters the aperture of the digital image capturing device, such that Moiré patterns caused by the interference between these spatial periodicities and the spatial periodicities in the light-sensing structures of the digital image capturing device are reduced in the output images of the digital image capturing device.

The drawback of these filters is that they only work for particular imaging conditions, such as particular combinations of zoom level, image resolution, distance between the object (e.g., a display screen) being captured and the image capturing device, and size of the periodic features in the object being captured. When any aspect of the imaging condition is changed, the filter often needs to be changed as well to avoid worsened image quality in the output image produced by the image capturing device. These filters can be expensive and selection of an appropriate filter for each of various imaging conditions can be a skill difficult to master for average users.

In addition, the filters to be used onboard the image capturing devices are not tailored to address the Moiré patterns that are produced due to the interference between the spatial periodicities associated with the sub-pixels of the display screen and the spatial periodicities associated with the light-sensing structures in the digital image capturing device. Therefore, the filters may not have designs that produce the necessary level of Moiré reduction for displays of different resolutions and sub-pixel structures. In fact, in a broadcast situation, the broadcaster cannot be assured that the image capturing device used to capture the images presented on the display device have any filters for Moiré reduction installed at all.

As described in this specification, a built-in Moiré reduction structure is included in a display screen. The built-in Moiré reduction structure, also referred to as a "blur layer" in this specification, can be a layer placed adjacent to the pixel layer on the viewer side of the pixel layer, that diffuses light emitted from the pixel layer before the light exits the display screen to the viewer side of the display screen. The pixel layer is a layer of the display screen in which boundaries of the sub-pixels of the display are defined and spatial periodicities associated with the boundaries of the sub-pixel elements are created in the light emanating from pixel layer toward the viewer side of the display screen. In some embodiments, sub-pixel level spatial frequencies are created by the boundaries of a periodic array of light-emitting pixel-elements, and the pixel layer is the layer in which the boundaries of the light-emitting pixel elements are defined. The blur layer is configured to suppress spatial frequencies in the light emanating from the pixel layer that are associated with the periodicities of the sub-pixel level spatial features (e.g., boundaries of the sub-pixel elements, or boundaries of the pixel-elements, or both) in the pixel layer. The diffusing power of the blur layer is controlled by the geometry of the blur layer and the size of the gap between the plane in which the boundaries of the sub-pixels (or the boundaries of the light-emitting pixel elements) are last defined and the plane in which the diffusing occurs. The diffusing power of the blur layer is controlled within a range that preserves the spatial frequencies that are equal or lower than the pixel-level spatial frequencies, such that image quality and resolution of the display screen are substantially preserved. In some embodiments, for example, when the light-emitting pixel elements are significantly smaller than the pixel pitch of the display, some pixel-level spatial frequencies (e.g., spatial frequencies greater than $1/(1.5W)$) may be suppressed by the blur layer, to improve Moiré patterns reduction effect of the blur layer.

When the sub-pixel level spatial frequencies (e.g., spatial periodicities associated with the colored sub-pixels, including the spatial repetitions of the sub-pixels of each color, and the spatial repetitions of the dark areas between adjacent sub-pixels) are substantially suppressed or removed by the blur layer from the light emanating from the pixel layer, as the light is received by the periodic light-sensing structures in a digital image capturing device, minimal Moiré patterns would be created in the output image of the image capturing device due to the spatial periodicities of the sub-pixels in the display screen. The suppression of the spatial frequencies associated with the sub-pixel level periodicities is accomplished through the blur layer because the blur layer is able to blur the boundaries between adjacent, different colored sub-pixels (and/or boundaries of the dark regions between light-emitting pixel or sub-pixel elements), such that the periodic linear features formed by these boundaries are randomized and substantially eliminated in the light exiting the blur layer to the viewer side of the display. When the blurred light arrives at the periodic light-sensing structures in a digital image capturing device, due to the absence of the sub-pixel level spatial periodicities in the received light, the periodic light-sensing structures no longer generate any significant Moiré patterns in its output images. This reduction of Moiré patterns is independent of the imaging conditions, such as the zoom level, image resolution, the distance between the display screen and the image capturing device, and size of the periodic features (e.g., the size of the sub-pixels and their spacing) in the object being captured.

The blur layer can be implemented in various types of digital displays in which periodic arrays of light-emitting sub-pixels of different colors are used to form pixels of an image. The color and brightness of each pixel in the image is controlled by the respective brightness of each of a set of colored sub-pixels (e.g., a set of red, blue, and green sub-pixels) located at a respective pixel location in the pixel layer of the display. Typically, the arrangement of sub-pixels located at each pixel location in the pixel layer is identical, and the sub-pixels of the same color in the pixel layer form periodic arrays (e.g., parallel linear stripes, or parallel lines of pixel segments or dots) in the pixel layer. In some implementations, depending on the arrangement and shape of the sub-pixels in a display, the periodic arrays formed by the sub-pixels of the same color may also exhibit other patterns, such as grids, zigzag lines, cross-hatches, and so on. The exact periodic pattern formed by the sub-pixels depends on the boundaries and locations of the sub-pixels in the pixel layer. In some cases, adjacent pixels in the pixel layer may share one or more sub-pixels, and the layout of sub-pixel elements in each pixel may be different from the layout of sub-pixel elements in an adjacent pixel. In some implementations, the boundaries between light-emitting pixel or sub-pixel elements are physical boundaries each separating a light emitting regions from a non-light-emitting region. In some embodiments, the boundaries between light-emitting pixel or sub-pixel elements are physical boundaries each separating light-emitting region of a first color from a light-emitting region of a second color. In some embodiments, the boundaries between light-emitting pixels or sub-pixels are virtual boundaries that are dynamically generated and may shift in location in different image frames. In some implementations, the boundaries between light-emitting pixel or sub-pixel elements can be virtual boundaries each separating a light emitting region from a non-light-emitting region. The boundaries between light-emitting pixel or sub-pixel elements can also be virtual boundaries each separating a light-emitting region of a first color from a light-emitting region of a second color. For example, a virtual boundary can be a boundary of a light-emitting footprint of an excitation beam on a florescent stripe, which disappears after the beam is removed.

When an image is presented on the display screen, the sub-pixels in the pixel layer emit light with different intensities depending on the color and composition of the image. The light emitted from the sub-pixels associated with the same color will exhibit a spatial periodicity due to the spatial periodicity of the sub-pixels of that color, as long as a sufficient number of sub-pixels of that color are simultaneously lit to generate the image. Similarly, the light emitted from the entire pixel layer will also exhibit a spatial periodicity due to the spatial periodicity of the dark areas between adjacent sub-pixels, as long as a sufficient number of sub-pixels are lit in the image. The sub-pixel level spatial frequencies in the light-emitted from the pixel layer are associated with the spatial periodicities of the sub-pixels. When the light emitted by the pixel layer arrives at the periodic light-sensing structures of a digital image capturing device, the periodic light and dark patterns in the incoming light, and the periodic on/off sensitivities of the light-sensing structures cause a light and dark beat pattern (or Moiré pattern) in the output image of the light-sensing structures. To remove the Moiré patterns caused due to the spatial periodicities of the sub-pixels, the sub-pixel level spatial frequencies can be suppressed by the blurring layer, while pixel level spatial frequencies, which are lower than the sub-pixel level spatial frequencies, can be preserved as much as possible to maintain image quality and resolution.

As set forth above, the spatial periodicities that exist in the light emitted by the sub-pixel level spatial features (e.g., the sub-pixel elements) depend on the boundaries and locations of the pixel and/or sub-pixel elements in the pixel layer. In some implementations, the boundary and location of each sub-pixel in the pixel layer can be defined by the boundary and location of a physical, individually controllable, light-emitting element, such as a colored LED light, or a small mirror reflecting colored light from a light source. In some implementations, the boundary and location of each sub-pixel in the pixel layer can be defined by the boundary and location of a light-emitting region formed (e.g., by projection or excitation) on a larger physical element (e.g., a fluorescent stripe) that is capable of providing multiple sub-pixels of the same color or multiple different colors. In some implementations, the boundary of the light-emitting region can be defined by the physical boundary of the larger physical element in some dimensions and by the virtual boundary of a footprint of an excitation beam on the larger physical element in other dimensions. Other combinations or screen configurations to define the boundaries of sub-pixels in the pixel layer are possible.

Although only certain types of display devices are described in this specification to illustrate example implementations of a built-in Moiré reduction structure in the display devices, the Moiré reduction structure can be implemented in other types of display screens as well. For example, in some implementations, the display screen includes active pixel and/or sub-pixel elements that generate the light emitted to the viewer side (e.g., as in an LED wall or fluorescent display). In some implementations, the display screen includes passive pixel and/or sub-pixel elements that do not actively generate the light emitted to the viewer side, but are addressed to selectively transmit or block light generated by other components (e.g., a black lighting layer) of the display screen (e.g., as in a LCD display). In some implementations, the display screen includes pixel and/or sub-pixel elements that do not actively generate the light emitted to the viewer side, but are addressed to selectively reflect light that is generated by other components of the display screen. In this specification, a pixel or sub-pixel element is considered to be "light-emitting" when light emanates from the pixel or sub-pixel element toward the viewer side through any one of direct light generation, light reflection, or light transmission mechanisms.

FIG. 1 illustrates an example of a laser-based display system using a screen having color phosphor stripes. Each color phosphor stripe serves as a light-emitting element that provides multiple sub-pixels of the display screen. Alternatively, color phosphor dots may also be used in the screen, where each color phosphor dot provides a single sub-pixel of the display screen.

As shown in FIG. 1, the display system includes a laser module 110 to produce and project at least one scanning laser beam 120 onto a screen 101. The screen 101 has parallel color phosphor stripes in the vertical direction where red phosphor absorbs the laser light to emit light in red, green phosphor absorbs the laser light to emit light in green and blue phosphor absorbs the laser light to emit light in blue. Adjacent three color phosphor stripes are in three different colors. One particular spatial color sequence of the stripes is shown in FIG. 1 as red, green, and blue. Other color sequences may also be used.

The laser beam 120 is at the wavelength within the optical absorption bandwidth of the color phosphors and is usually at a wavelength shorter than the visible blue and the green and red colors for the color images. As an example, the color phosphors may be phosphors that absorb UV light in the spectral range from about 380 nm to about 420 nm to produce desired red, green, and blue light. The laser module 110 can include one or more lasers such as UV diode lasers to produce the beam 120, a beam scanning mechanism to scan the beam 120 horizontally and vertically to render one image frame at a time on the screen 101, and a signal modulation mechanism to modulate the beam 120 to carry the information for image channels for red, green, and blue colors. In some implementations, such display systems may be configured as rear projection systems where the viewer and the laser module 110 are on the opposite sides of the screen 101.

Figure 2A:
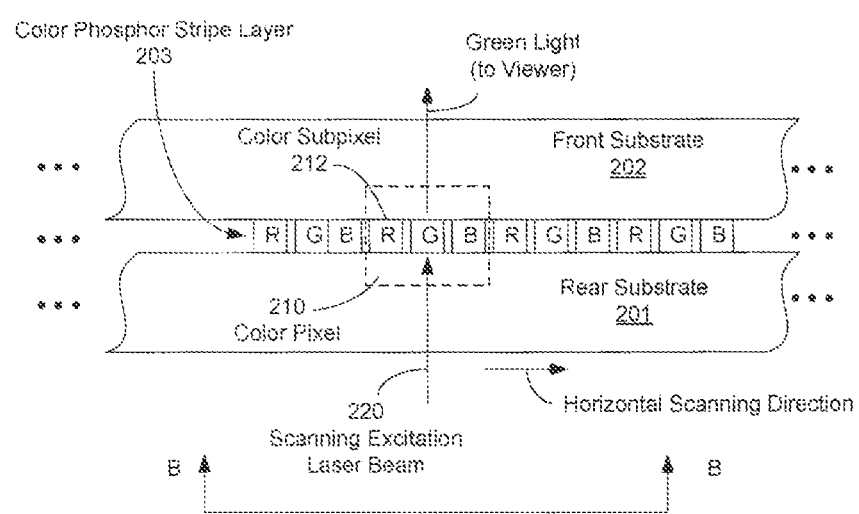
FIGS. 2A and 2B show one example screen structure and the structure of pixels and sub-pixels on the screen in FIG. 1.

FIG. 2A shows an exemplary design of the screen 101 in FIG. 1. The screen 101 may include a rear substrate 201 which is transparent to the scanning laser beam 120 and faces the laser module 110 to receive the scanning laser beam 120. A second front substrate 202 is fixed relative to the rear substrate 201 and faces the viewer in a rear projection configuration. A color phosphor stripe layer 203 is placed between the substrates 201 and 202 and includes phosphor stripes. The color phosphor stripes for emitting red, green, and blue colors are represented by "R", "G" and "B," respectively. The front substrate 202 is transparent to the red, green, and blue colors emitted by the phosphor stripes. The substrates 201 and 202 may be made of various materials, including glass or plastic panels. Each color pixel includes portions of three adjacent color phosphor stripes in the horizontal direction and its vertical dimension is defined by the beam spread of the laser beam 120 in the vertical direction. As such, each color pixel includes three sub-pixels of three different colors (e.g., the red, green, and blue). The laser module 110 scans the laser beam 120 one horizontal line at a time, e.g., from left to right and from top to bottom to fill the screen 101. The laser module 110 is fixed in position relative to the screen 101 so that the scanning of the beam 120 can be controlled in a predetermined manner to ensure proper alignment between the laser beam 120 and each pixel position on the screen 101.

Figure 2B:
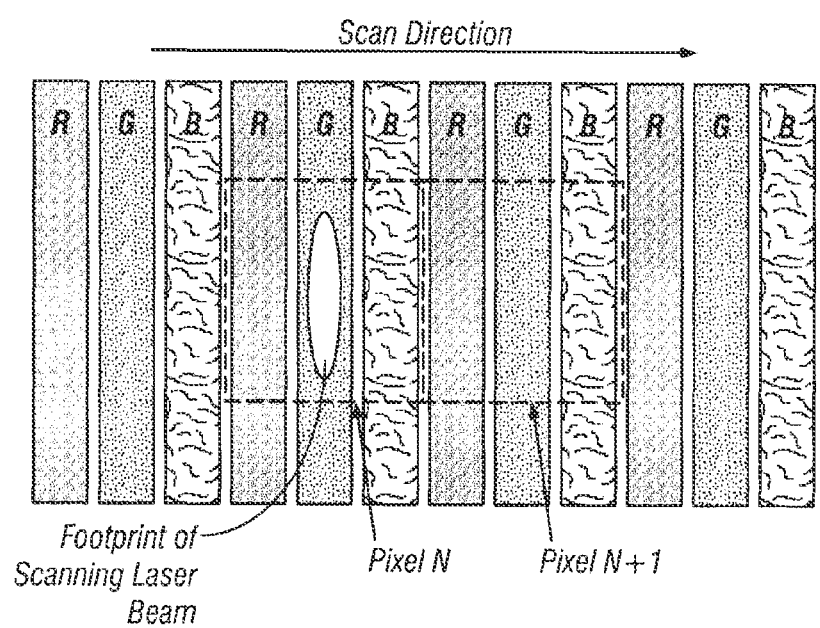

In FIG. 2A, the scanning laser beam 120 is directed at the green phosphor stripe within a pixel to produce green light for that pixel. FIG. 2B further shows the operation of the screen 101 in a view along the direction B-B perpendicular to the surface of the screen 101. Since each color stripe is longitudinal in shape, the cross section of the beam 120 may be shaped to be elongated along the direction of the stripe to maximize the fill factor of the beam within each color stripe for a pixel. This may be achieved by using a beam shaping optical element in the laser module 110.

A laser source that is used to produce a scanning laser beam that excites a phosphor material on the screen may be a single mode laser or a multimode laser. The laser may also be a single mode along the direction perpendicular to the elongated direction phosphor stripes to have a small beam spread that is confined by the width of each phosphor stripe. Along the elongated direction of the phosphor stripes, this laser beam may have multiple modes to spread over a larger area than the beam spread in the direction across the phosphor stripe. This use of a laser beam with a single mode in one direction to have a small beam footprint on the screen and multiple modes in the perpendicular direction to have a larger footprint on the screen allows the beam to be shaped to fit the elongated color sub-pixel on the screen and to provide sufficient laser power in the beam via the multi-modes to ensure sufficient brightness of the screen.

In the screen configuration shown in FIG. 2A, the boundaries of colored sub-pixels are defined in the color phosphor stripe layer 203. A blur layer (not shown) can be placed adjacent the color phosphor stripe layer 203 on the viewer side of the display screen relative to the color phosphor stripe layer 203 as a built-in Moiré reduction layer. If the display screen includes additional screen layers that further define or enhance the boundaries of the sub-pixels, then the blur layer can be placed adjacent to the last layer that define or enhance the boundaries of the sub-pixels on the viewer side. More details on the placement of the blur layer are provided when other variations of the screen structures are described later in the specification.

In the example shown in FIG. 2A, each of the light-emitting element in the fluorescent screen 101 is a fluorescent stripe that emits a designated color under optical excitation. A fluorescent stripe that emits light of a designated color can be a fluorescent stripe formed of a particular fluorescent material that emits the designed color.

Alternatively, in some implementations, a light-emitting element in the fluorescent screen 101 can be constructed by a combination of a color filter stripe over a contiguous and uniform white fluorescent layer that is made of mixed phosphors. The mixed phosphors emit wide spectrum of visible light (e.g., white light) under the optical excitation of the excitation light, and when the light passes through the color filter stripe of a designated color, only light of the designated color is transmitted to the viewer side of the display screen, while light of other colors are absorbed or reflected.

In such implementations, the color filter stripes of three designated colors (e.g., red, blue, and green) can exist in a filter layer located adjacent to the continuous and uniform white fluorescent layer. The continuous and uniform white fluorescent layer and the filter layer together forms the pixel layer of the display screen. The boundaries of sub-pixels are defined in the pixel layer, by the boundaries of the color filter stripes in the horizontal direction (e.g., the direction perpendicular to the direction along color filter stripes), and by the boundaries of the footprint of the excitation beam in the vertical direction (e.g., the direction along the color filter stripes).

In implementations where the pixel layer includes a continuous and uniform white fluorescent layer and a filter layer having repeated sequences of colored filter stripes, a blur layer can be placed adjacent to the color filter layer on the viewer side of the display screen relative to the color filter layer, and serve as a built-in Moiré reduction layer. If the display screen includes additional screen layers that further define or enhance the boundaries of the sub-pixels, then the blur layer can be placed adjacent to the last layer that define or enhance the boundaries of the sub-pixels on the viewer side. In some implementations, the blur layer includes a transparent spacer layer, and the transparent spacer layer of the blur layer is placed next to the color filter layer (or the last layer that define or enhance the boundaries of the sub-pixels on the viewer side) of the pixel layer.

In some implementations, the color filter stripes of the color filter layer form a thin film that is laminated on a transparent substrate, and the thin film side is placed adjacent to the fluorescent layer. In such implementations, the layer that last defines the boundaries of the sub-pixels is the thin film layer formed by the colored filter stripes. In some implementations, the transparent substrate on which the color filter stripes are laminated can serve as part of the spacer layer of the blur layer. Depending on the thickness and refractive index of the transparent substrate, the transparent substrate layer can serve as the spacer layer of the blur layer by itself or in combination with another transparent spacer layer. More details of such implementations are described later in the specification.

As shown in FIGS. 2A and 2B, each light-emitting pixel element of the pixel layer includes an identical pattern of three light-emitting sub-pixel elements (e.g., the segments of florescent stripes labeled "R", "G", and "B" within the dashed box labeled "Pixel N"). The boundary of each sub-pixel element along the scan direction (e.g., the horizontal direction in FIG. 2B) of the excitation beam is defined by the boundary of the footprint of the excitation beam on the corresponding florescent stripe of the sub-pixel element. This boundary is a virtual boundary dynamically generated by the scanning excitation beam, and will vanish once the beam is removed from the sub-pixel element. The boundary of each sub-pixel element along the elongated stripe direction (e.g., the vertical direction in FIG. 2B) of the excitation beam is defined by the boundary of the corresponding florescent stripe of the sub-pixel element. This boundary is a physical boundary that persists regardless of the presence of the scanning excitation beam. In some implementations, the boundary of a sub-pixel element is a boundary that separates a light-emitting region of a first color from a light-emitting region of a second color. For example, when the florescent stripes shown in FIG. 2B are closely spaced with substantially no gap in between, the boundary between adjacent florescent stripes separates a sub-pixel element of a first color from a sub-pixel element of another color. In some embodiments, the boundary of a sub-pixel element is a boundary that separates a light-emitting region from a non-light-emitting region. For example, when each pair of adjacent florescent stripes shown in FIG. 2B are separated by a respective non-light-emitting stripe divider or non-light-emitting gap, the boundary of the sub-pixel element is a boundary that separates a light-emitting region (e.g., the light-emitting sub-pixel element) from a non-light-emitting region (e.g., the stripe divider or gap). In some implementations, each sub-pixel element can have a boundary that is partially virtual and partially physical. For another example, in FIG. 2B, the boundary of two adjacent pixels formed by the same set of consecutive florescent stripes (e.g., two adjacent pixels along the elongated stripe direction in FIG. 2B) is a virtual boundary that is generated only when at least one of the two adjacent pixels are activated by the scanning excitation beam. In this case, the virtual boundary either separates a light-emitting region from a non-light emitting region, or separating a light-emitting region of a first color from another light-emitting region of the same first color.

Similar to the boundaries of sub-pixel elements in a pixel layer, boundaries of light-emitting pixel elements can also have physical and virtual portions. For example, in an LED wall, full-color LED elements can be arranged in a periodic array, and each LED element has a physical non-light-emitting frame that separates a light-emitting region (e.g., the LED element) and a non-light-emitting region (e.g., the frame and space between adjacent LED elements). For another example, in some implementations, a display screen utilizes pixel elements having overlapping sub-pixels (e.g., when four adjacent pixels share a common sub-pixel element in the middle, or when adjacent rows of pixels are interlaced and share a zigzagged row of sub-pixels), the boundary of each light-emitting pixel element is a virtual boundary that is only defined when the sub-pixels of the pixel element are lit according to specific imaging requirements for that pixel in an image frame.

As shown in the example in FIG. 2B, the pixel elements in the layer are uniformly spaced from one another in a periodic array. The periodic array has a respective pixel pitch $W_i$ in each of two or more directions i (e.g., the scan direction and the elongated stripe direction in FIG. 2B). The pixel pitch $W_i$ is the smallest distance between adjacent pixels (e.g., the distance between the centers of the adjacent pixels) along a respective direction i in the pixel layer. In this example, the pixel pitch W is close to the total widths of the constituent sub-pixel elements for each pixel. In other examples (e.g., in an LED wall with a small fill factor), the pixel pitch W may be much larger (e.g., 1.2-3 times) than the total width of an entire light-emitting pixel element.

The boundaries of light-emitting sub-pixel elements, and sometimes, the boundaries of the light-emitting pixel elements, in the pixel layer can form sub-pixel level spatial features and create spatially periodic linear features having one or more spatial frequencies greater than 1/W. The blur layer of the Moiré reduction structure suppresses some or all of these sub-pixel level spatial frequencies to reduce Moiré patterns formed from these spatial frequencies.

Referring now to FIG. 3, an example implementation of the laser module 110 in FIG. 1 is illustrated. A laser array 310 with multiple lasers is used to generate multiple laser beams 312 to simultaneously scan the screen 101 for enhanced display brightness. A signal modulation controller 320 is provided to control and modulate the lasers in the laser array 310 so that the laser beams 312 are modulated to carry the image to be displayed on the screen 101. The signal modulation controller 320 can include a digital image processor that generates digital image signals for the three different color channels and laser driver circuits that produce laser control signals carrying the digital image signals. The laser control signals are then applied to modulate the lasers, e.g., the currents for laser diodes, in the laser array 310.

The beam scanning can be achieved by using a scanning mirror 340 such as a galvo mirror for the vertical scanning and a multi-facet polygon scanner 350 for the horizontal scanning. A scan lens 360 can be used to project the scanning beams form the polygon scanner 350 onto the screen 101. The scan lens 360 is designed to image each laser in the laser array 310 onto the screen 101. Each of the different reflective facets of the polygon scanner 350 simultaneously scans N horizontal lines where N is the number of lasers. In the illustrated example, the laser beams are first directed to the galvo mirror 340 and then from the galvo mirror 340 to the polygon scanner 350. The output scanning beams 120 are then projected onto the screen 101. A relay optics module 330 is placed in the optical path of the laser beams 312 to modify the spatial property of the laser beams 312 and to produce a closely packed bundle of beams 332 for scanning by the galvo mirror 340 and the polygon scanner 350 as the scanning beams 120 projected onto the screen 101 to excite the phosphors and to generate the images by colored light emitted by the phosphors.

The laser beams 120 are scanned spatially across the screen 101 to hit different color pixels at different times. Accordingly, each of the modulated beams 120 carries the image signals for the red, green, and blue colors for each pixel at different times and for different pixels at different times.

Hence, the beams 120 are coded with image information for different pixels at different times by the signal modulation controller 320. The beam scanning thus maps the time-domain coded image signals in the beams 120 onto the spatial pixels on the screen 101. For example, the modulated laser beams 120 can have each color pixel time equally divided into three sequential time slots for the three color sub-pixels for the three different color channels. The modulation of the beams 120 may use pulse modulation techniques to produce desired grey scales in each color, a proper color combination in each pixel, and desired image brightness.

In one implementation, the multiple beams 120 are directed onto the screen 101 at different and adjacent vertical positions with two adjacent beams being spaced from each other on the screen 101 by one horizontal line of the screen 101 along the vertical direction. For a given position of the galvo mirror 340 and a given position of the polygon scanner 350, the beams 120 may not be aligned with each other along the vertical direction on the screen 101 and may be at different positions on the screen 101 along the horizontal direction. The beams 120 can only cover one portion of the screen 101. At a fixed angular position of the galvo mirror 340, the spinning of the polygon scanner 350 causes the beams 120 from N lasers in the laser array 310 to scan one screen segment of N adjacent horizontal lines on the screen 101. At the end of each horizontal scan over one screen segment, the galvo mirror 340 is adjusted to a different fixed angular position so that the vertical positions of all N beams 120 are adjusted to scan the next adjacent screen segment of N horizontal lines. This process iterates until the entire screen 101 is scanned to produce a full screen display.

The stripe design in FIG. 2B for the fluorescent screen 101 in FIGS. 1 and 3 can be implemented in various configurations. FIG. 2A shows one example which places the fluorescent layer 203 such as a color phosphor stripe layer between two substrates 201 and 202. In a rear projection system, it is desirable that the screen 101 couple as much light as possible in the incident scanning excitation beam 120 into the fluorescent layer with while maximizing the amount of the emitted light from the fluorescent layer that is directed towards the viewer side. A number of screen mechanisms can be implemented, either individually or in combination, in the screen 101 to enhance the screen performance, including efficient collection of the excitation light, maximization of fluorescent light directed towards the viewer side, enhancement of the screen contrast and reduction the screen glare. In addition, a blur layer serving as a built-in Moiré reduction structure can also be implemented. The structure and materials of the screen 101 can be designed and selected to meet constraints on cost and other requirements for specific applications.

Figure 4A:
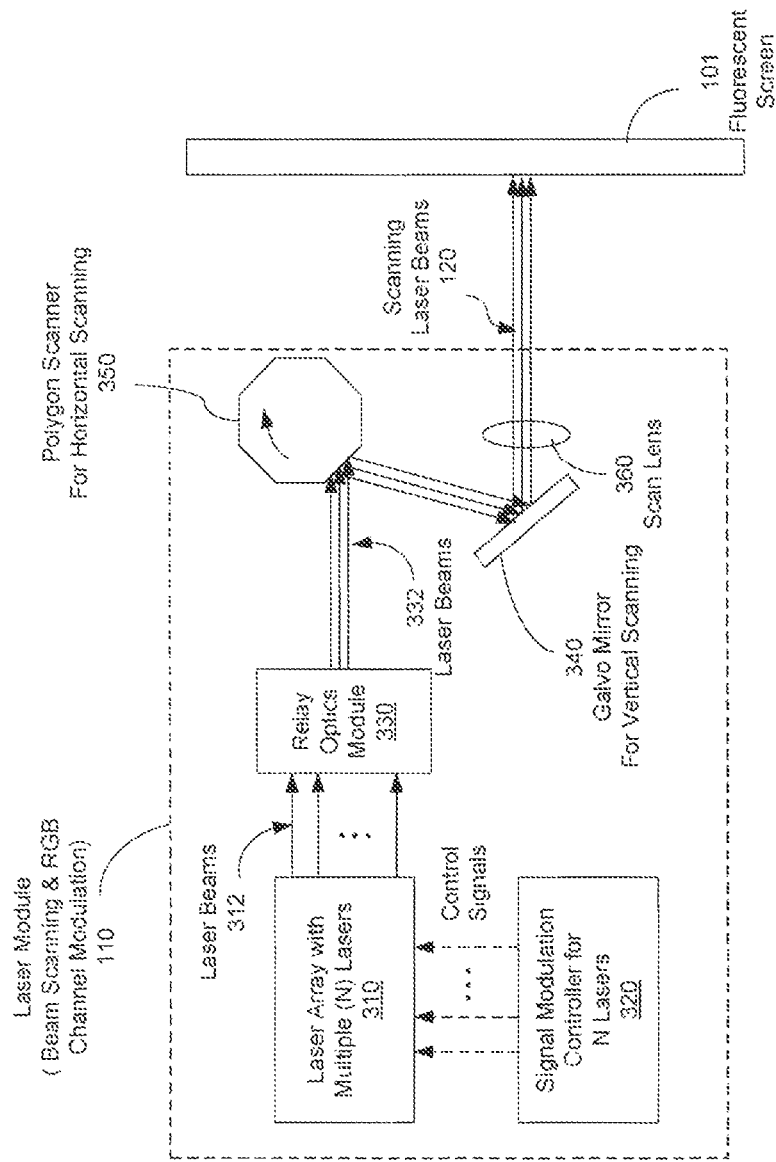
FIGS. 4A and 4B show two example scanning beam displays using fluorescent screens where a polygon scanner is positioned upstream from a galvo mirror along the propagation direction of an excitation beam.
Figure 4B:
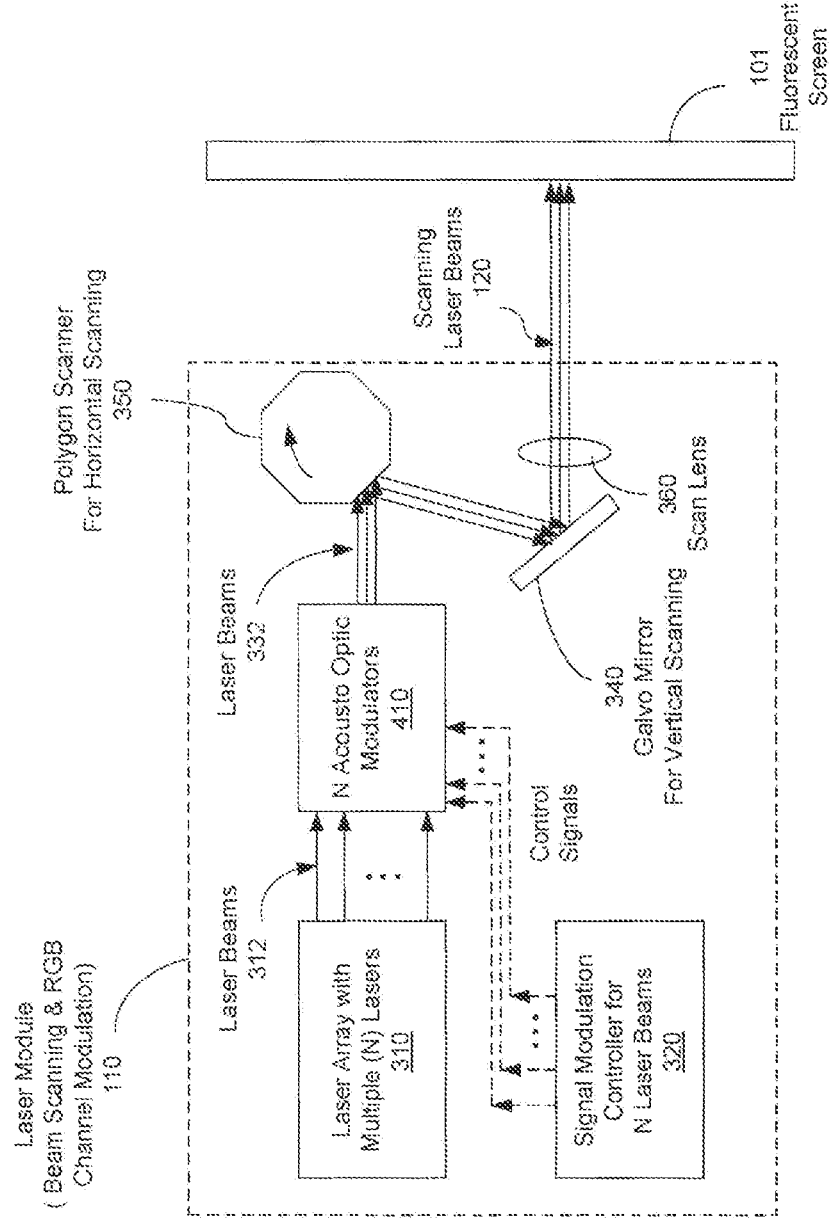

In FIG. 3, the beam scanning is achieved by using the galvo mirror 340 for vertical scanning to direct an excitation beam to the polygon scanner 350 which in turn directs the excitation beam onto the screen 101. Alternatively, the polygon scanner 350 can be used to scan the excitation beam onto the galvo mirror 350 which further directs the beam to the screen 101. FIGS. 4A and 4B show two examples of such scanning beam display systems in which the order of the polygon scanner 350 and the galvo mirror 340 is reversed from the order in FIG. 3. The display in FIG. 4B uses N acousto-optic modulators 410 to respectively modulate N continuous-wave (CW) excitation laser beams 312 from the laser array 310 to produce modulated laser beams 332 which carry image data. Other optical modulators may also be used to replace the acousto-optic modulators 410.

Figure 5:
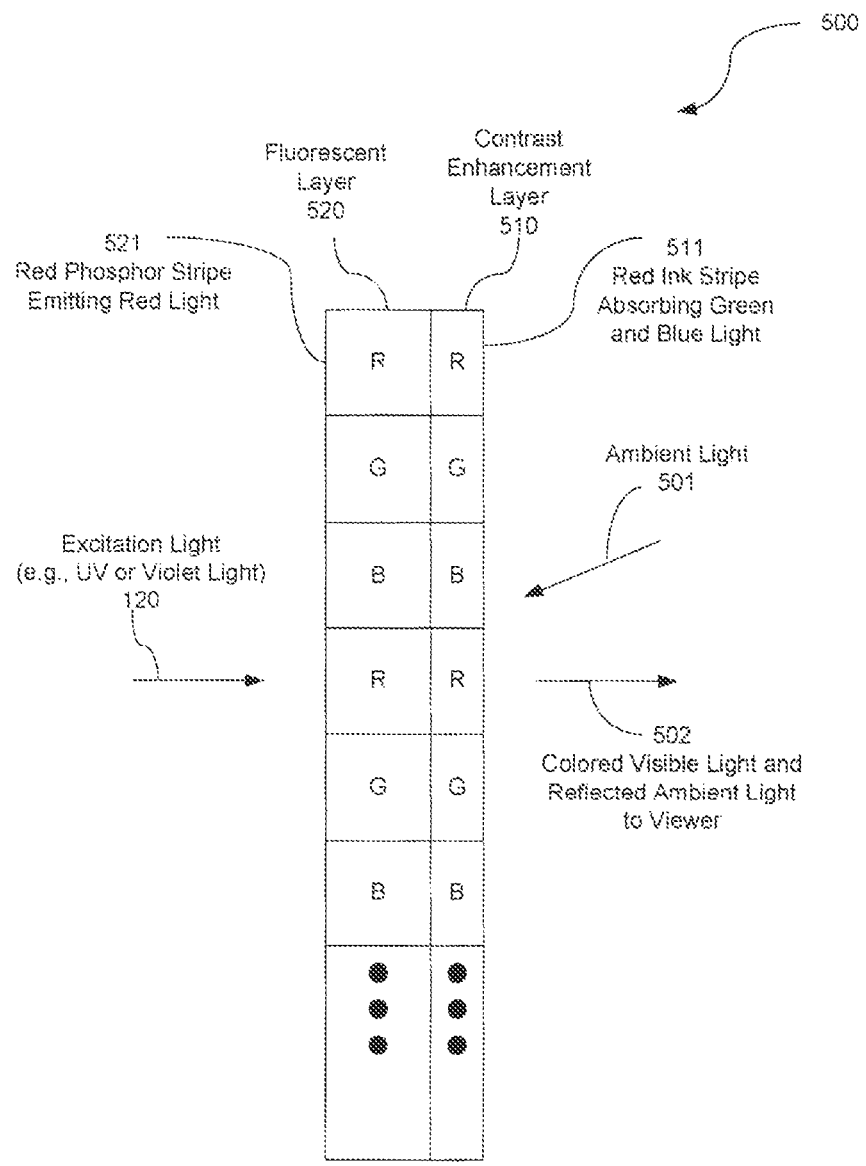
FIG. 5 shows an example fluorescent screen design with a contrast enhancement layer.

FIG. 5 shows one example of a screen 500 that uses a contrast enhancement layer 510 on the viewer side of the fluorescent layer 520. The fluorescent layer 520 includes parallel phosphor stripes. Accordingly, the contrast enhancement layer 510 also includes matching parallel stripes made of different materials. For a red phosphor stripe 521 that emits red light in response to excitation by the excitation light (e.g., UV or violet light), the matching stripe 511 in the contrast enhancement layer 510 is made of a "red" material that transmits in a red spectral band covering the red light emitted by the red phosphor stripe 521 and absorbs or otherwise blocks other visible light including the green and blue light. Similarly, for a green phosphor stripe that emits green light in response to excitation by UV light, the matching stripe in the contrast enhancement layer 510 is made of a "green" material that transmits in a green spectral band covering the green light emitted by the green phosphor and absorbs or otherwise blocks other visible light including the red and blue light. For a blue phosphor stripe that emits blue light in response to excitation by UV light, the matching stripe in the contrast enhancement layer 510 is made of a "blue" material that transmits in a blue spectral band covering the blue light emitted by the blue phosphor and absorbs or otherwise blocks other visible light including the green and red light. These matching parallel stripes in the contrast enhancement layer 510 are labeled as "R," "G" and "B," respectively.

In this example, the contrast enhancement layer 510 includes different stripe filtering regions that spatially align with and match respective fluorescent regions along the direction perpendicular to the screen. Each filtering region transmits light of a color that is emitted by a corresponding matching fluorescent region and blocks light of other colors. Different filtering regions in the layer 510 may be made of materials that absorb light of other colors different from the colors emitted by the respective matching fluorescent regions. Examples of suitable materials include dye-based colorants and pigment-based colorants. In addition, each filtering region in the contrast enhancement layer 510 can be a multi-layer structure that effectuates a band-pass interference filter with a desired transmission band. Various designs and techniques may be used for designing and constructing such filters. U.S. Pat. No. 5,587,818 entitled "Three color LCD with a black matrix and red and/or blue filters on one substrate and with green filters and red and/or blue filters on the opposite substrate," and U.S. Pat. No. 5,684,552 entitled "Color liquid crystal display having a color filter composed of multilayer thin films" describe examples of red, green and blue filters that may be used in the layer 510 in the screen 500 in FIG. 5.

In operation, the excitation light 120 (e.g., UV light) enters the fluorescent layer 520 to excite different phosphors to emit visible light of different colors. The emitted visible light transmits through the contrast enhancement layer 510 to reach the viewer. The ambient light 501 incident to the screen 800 enters the contrast enhancement layer 510 and a portion of the incident ambient light 501 is reflected towards the viewer by passing through the contrast enhancement layer 510 for the second time. Therefore, the total optical output 502 towards the viewer includes image carrying colored visible light emitted by the phosphor layer 520 and the reflected ambient light. This reflected ambient light does not carry image and thus tends to wash out the image produced at the phosphor layer 520. Because this reflected ambient light towards the viewer has passed the contrast enhancement layer 510 twice and thus has been filtered and attenuated twice, the intensity of the reflected ambient light is reduced by approximately two thirds of that of the received ambient light. As an example, the green and blue portions of the incident ambient light 501 comprise approximately two thirds of the flux of the ambient light 501 entering a red sub-pixel. The green and blue portions of the incident ambient light 501 are blocked by the contrast enhancement layer 510. Only the red portion of the ambient light within the transmission band of the red filter material in the contrast enhancement layer 510 transmits through the layer 510 and a part of the transmitted red ambient light is reflected back to the viewer. This part of the reflected ambient light is essentially the same color for the sub-pixel generated by the underlying color phosphor stripe and thus the color contrast is not adversely affected.

In the example screen configuration shown in FIG. 5, the boundary of each colored sub-pixel is defined in the fluorescent layer 520 by the physical boundary of the fluorescent stripe in a first direction and by the boundary of the footprint of the excitation beam on the fluorescent stripe in a second direction orthogonal to the first direction. In addition, the boundary of each colored sub-pixel in a fluorescent stripe is further enhanced in the first direction by the physical boundary of a corresponding color enhancement stripe. In this example configuration, the fluorescent layer 520 and the contrast enhancement layer 510 together forms the pixel layer in which the respective boundaries of the sub-pixel elements (and similarly, respective boundaries of the pixel elements) of the display screen are defined. A blur layer can be placed adjacent to the contrast enhancement layer 510 to serve as the built-in Moiré reduction structure on the viewer side.

The above use of a color-selective absorbent material in the contrast enhancement layer 510 for each sub-pixel to enhance the display contrast can also be implemented by mixing such a material with the light-emitting fluorescent material in each sub-pixel without a separate contrast enhancement layer. In one implementation, each phosphor region in the fluorescent layer design can be formed of a mixture of a fluorescent material and a color-selective absorbent material that transmits light emitted by the fluorescent material and absorbs light of other colors. Hence, the contrast enhancing feature is built into each sub-pixel to reduce the reflected ambient light to the viewer.

Figure 6:
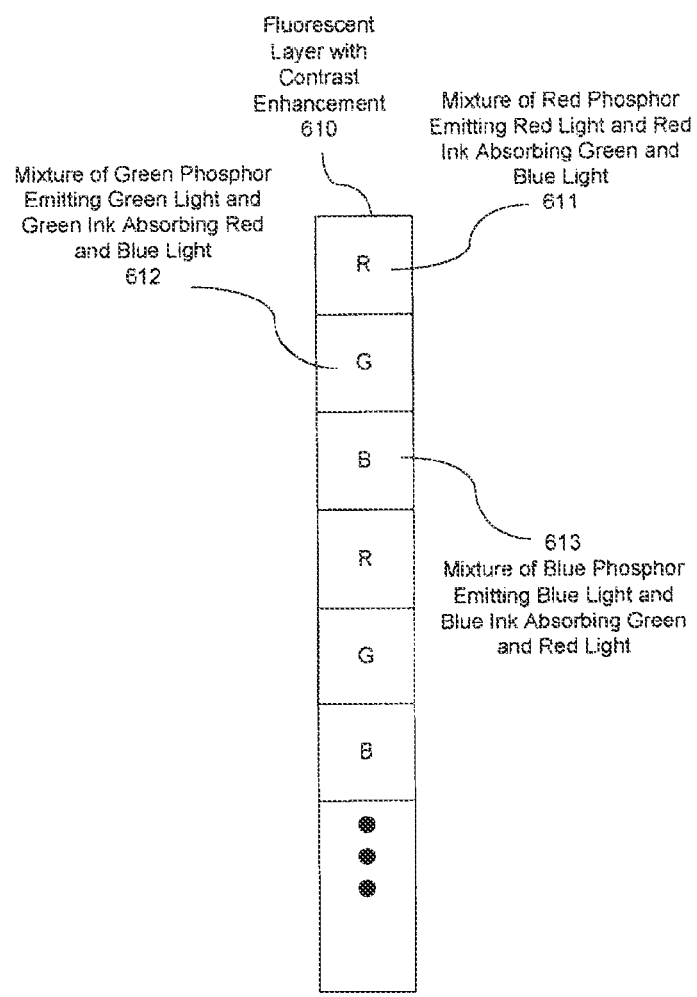
FIG. 6 shows another example fluorescent screen design with a contrast enhancement material composition in each fluorescent stripe.

FIG. 6 shows another implementation that uses red, green, and blue phosphor materials with built-in contrast enhancing capability for emitting red, green, and blue light, respectively, in a common fluorescent layer 610 of parallel fluorescent stripes. Consider three consecutive red, green, and blue phosphor stripes 611, 612 and 613. The material for the red phosphor stripe 611 is a mixture of a red phosphor capable of emitting red light and a red ink or pigment which transmits the red light and absorbs other light including the green and blue light. Since the red ink or pigment is mixed with the red phosphor, one of the notable characteristics is that the red ink or pigment substantially transmits (~100%) below the wavelength of around 420 nm in order to prevent absorbing the excitation light. Furthermore, the red ink or pigment can substantially transmit at a wavelength above around 580 nm to allow for the emitted red color from the red phosphors.

The material for the green phosphor stripe 612 is a mixture of a green phosphor emitting green light and a green ink or pigment which transmits the green light and absorbs other light including the red and blue light. Since the green ink or pigment is mixed with the green phosphor, one of the notable characteristics is that the green ink or pigment substantially transmits (~100%) below the wavelength of around 420 nm in order to prevent absorbing the excitation light. Furthermore, the green ink or pigment can substantially transmit at a wavelength window of above around 480 nm and 5 below about 580 nm to allow for the emitted green color from the green phosphors.

The material for the blue phosphor stripe 613 is a mixture of a blue phosphor emitting blue light and a blue ink or pigment which transmits the blue light and absorbs other light including the red and green light. Since the blue ink or pigment is mixed with the blue phosphor, one of the notable characteristics is that the blue ink or pigment substantially transmits (~100%) below the wavelength of around 480 nm in order to prevent absorbing the excitation light (below ~420 nm) and to allow for the emitted blue color from the blue phosphors. The contrast-enhancing fluorescent layer 610 can be combined with various screen designs and configurations described in this application.

If a display screen uses the fluorescent layer with built-in contrast enhancement as described with respect to FIG. 6, the contrast-enhancing fluorescent layer 610 is the pixel layer of the display screen, and the boundaries of the sub-pixel elements (and similarly, the boundaries of the pixel elements) are defined in the contrast-enhancing fluorescent layer. If no additional layer exists adjacent to the contrast-enhancing fluorescent layer 610 to further define and enhance the boundaries of the pixels and/or sub-pixels, a blur layer can be placed adjacent to the contrast-enhancing fluorescent layer 610 on the viewer side to serve as the build-in Moiré reduction structure for the display screen. If there are other layers (e.g., a color filter layer) in the display screen that further defines or enhances the boundaries of the pixels and/or sub-pixels, then the blur layer can be placed adjacent to the last layer on the viewer side that defines or enhances the boundaries of the pixels and/or sub-pixels, and the blur layer is placed on the viewer side relative to said last layer.

The above described fluorescent screens use different phosphor materials in different fluorescent stripes to produce different colors under excitation of the excitation light. Alternatively, different fluorescent stripes can be formed by the same fluorescent material that emits white light and can further include color filters to produce desired different colors from the fluorescent light. The contrast enhancement layer 510 in FIG. 5 can be used to implement such color filters so that each color filter achieves both contrast enhancement and generation of a designated sub-pixel color. In some implementations, the contrast-enhancement layer can include non-light-emitting borders (e.g., stripe dividers) between adjacent pixel and/or sub-pixel elements, and/or adjacent groups of pixel elements.

Figure 7:
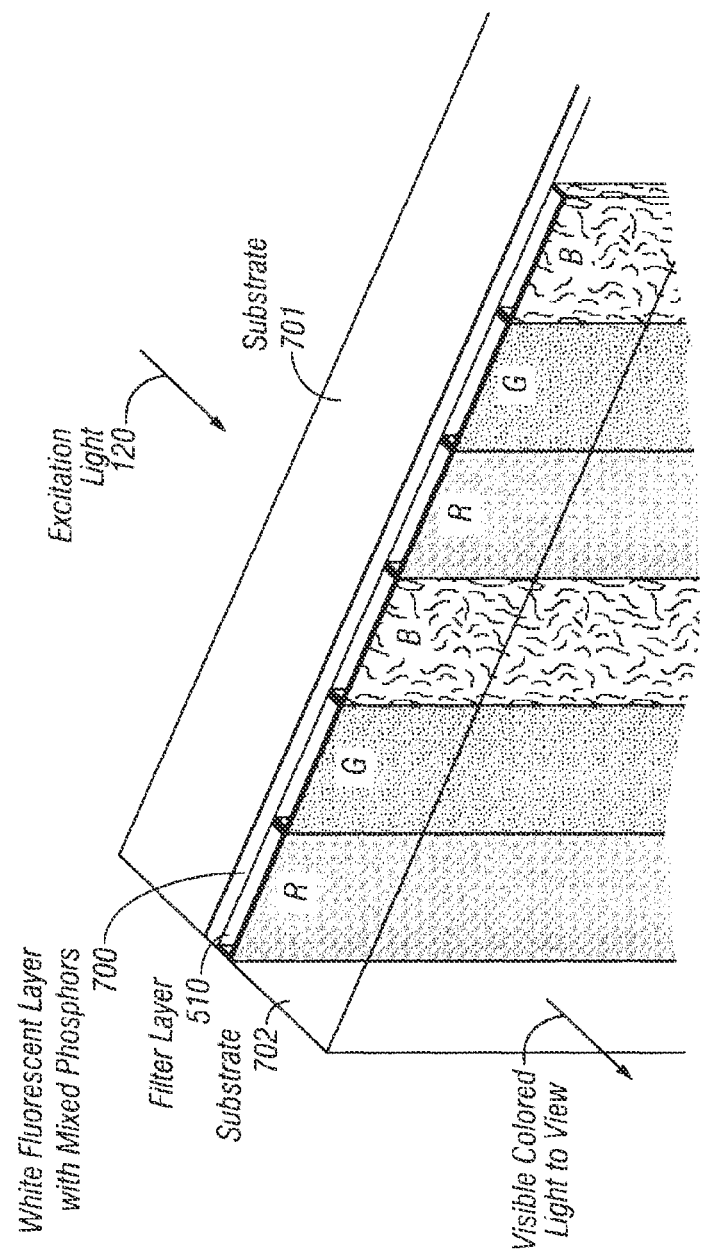
FIG. 7 illustrates another example fluorescent screen design that has a contiguous and uniform layer of mixed phosphors that emits white light.

FIG. 7 illustrates an example of a fluorescent screen design that has a contiguous layer 700 containing uniformly distributed mixed phosphors. This mixed phosphor layer 700 is designed and constructed to emit white light under optical excitation of excitation light. The mixed phosphors in the mixed phosphor layer 700 can be designed in various ways and a number of compositions for the mixed phosphors that emit white light are known and documented. Other non-phosphor fluorescent materials that emit white light can also be used for the layer 700. As illustrated, a layer 510 of color filters, such as stripes of red-transmitting, green-transmitting, and blue-transmitting filters, is placed on the viewer side of the mixed phosphor layer 700 to filter the white light and to produce colored output towards the viewer. In this example, the layers 700 and 510 are sandwiched between substrates 701 and 702. The color filters in the layer 510 may be implemented in various configurations, including in designs similar to the color filters used in color LCD panels. In each color filter region e.g., a red-transmitting filter, the filter transmits the red light and absorbs light of other colors including green light and blue light.

The screen structure in FIG. 7 is simpler than other screen designs with different fluorescent stripes because the mixed phosphor layer 700 in FIG. 7 is a contiguous layer without striped spatial structures. This construction avoids alignment issues associated with aligning the filters in layer 510 with respective fluorescent stripes in the layer 520 in FIG. 5. The substrate 701 receives the excitation light and thus can be made of a material transparent to the excitation light, e.g., violet or UV light. The substrate 702 faces the viewer and can be made of a material transparent to the colored light filtered by the filters in the layer 510. In fabrication, the layer 510 can be fabricated on the substrate 702 and the layer 700 can be fabricated on the substrate 701. The two substrates 701 and 702 can be engaged to each other to form the screen. At the output surface of the second substrate 702, an anti-reflection coating (AR) may be formed to improve the light transmission to the viewer. In addition, a hard protection layer may be formed over the second substrate 702 to protect the screen surface.

In the example fluorescent screen design shown in FIG. 7, the continuous fluorescent layer 700 and the filter layer 510 forms the pixel layer of the screen. A blur layer can be placed adjacent to the filter layer 510 on the viewer side to serve as the built-in Moiré reduction structure for the display screen. The diffusing power of the blur layer needs to be chosen to selectively remove the sub-pixel level spatial frequencies without severely impacting the pixel-level resolution of the images. In some implementation, the diffusing power of the blur layer is affected by the distance between the plane in which the boundaries of the sub-pixels are last defined, and the plane in which the diffusing occurs, and for a given material filling the gap between the two planes, a larger distance corresponds to a larger diffusing power. Similarly, for a given distance between the two planes, a low refractive index material filling the gap between the two planes corresponds to a larger diffusing power. In some implementations, where structures with irregular refractive surfaces (e.g., a random bead monolayer) are used to diffuse the light emitted by the pixel layer, a higher refractive index of the material used to form the structure correspond to the higher diffusing power of the structure.

As described with respect to FIG. 7, in some implementations, the filter layer 510 can be fabricated on the substrate 702, where the substrate 702 is placed on the viewer side of the display relative to the filter layer 510. In such implementations, a thin layer of diffusing material (e.g., a thin layer of material having irregular refractive surfaces) (not shown in FIG. 7) can be directly laminated on the side of the substrate 702 facing the viewer side. The thickness of the substrate 702 can be chosen such that the substrate 702 serves as a spacer layer between the filter layer 510 and the thin layer of diffusing material (not shown), and that the substrate 702 and the thin layer of material together forms the blur layer for Moiré reduction. In some implementations, if the thickness of the substrate 702 is not sufficient to provide the spacing needed between the thin layer of diffusing material and the layer that last define or enhance the sub-pixel boundaries, an additional transparent layer can be inserted between the substrate 702 and the thin layer of diffusing material to make up the spacing required. In some implementations, the thin layer of diffusing material can be laminated directly on the additional transparent layer. In some implementations, the filter layer can include non-light-emitting borders (e.g., stripe dividers) between adjacent filter stripes.

FIGS. 8A-8D illustrate a few example configurations of display screens that include a blur layer for reducing Moiré patterns associated with the interference between periodic sub-pixel level spatial features (e.g., periodic sub-pixels) of the display screen and periodic light-sensing structures (e.g., colored photo-sensor arrays) in digital image capturing devices. The blur layer includes a diffusing layer and a spacer layer which in combination create the desired diffusing power for the blur layer. The spacer layer is disposed adjacent to the pixel layer, while the diffusing layer is disposed on the viewer side of the spacer layer. The spacer layer serves to couple the light emitted by the pixel layer to the diffusing layer.

In these example configurations, an example blur layer is implemented by a random bead layer 802 serving as the diffusing layer. However, blurring layers having other diffusing structures are possible, such as a transparent film with irregular, non-periodic, grooves or other non-periodic bumpy surface features, can also be used.

Figure 8A:
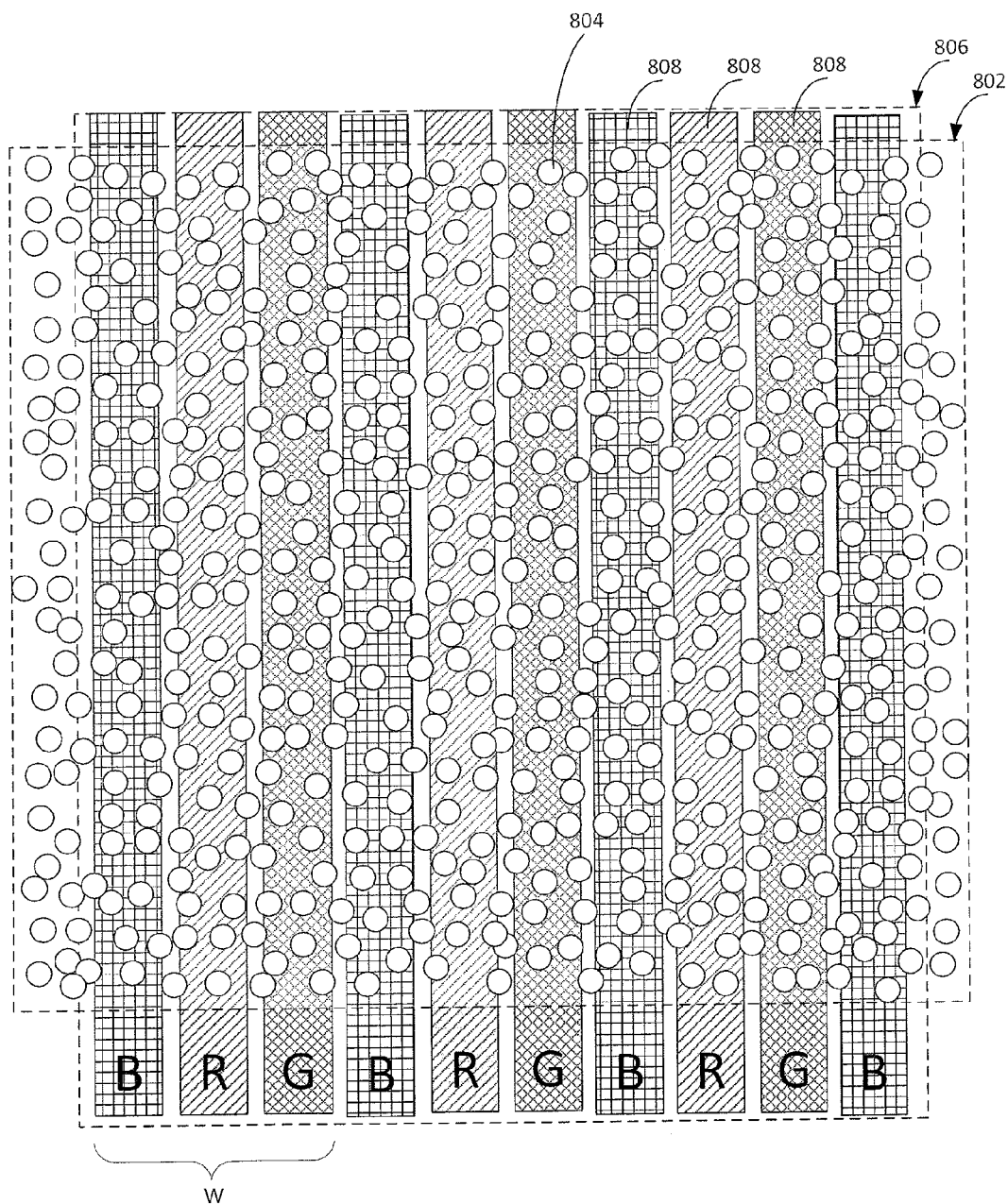
FIGS. 8A-8D illustrate a few example screen configurations including a blur layer placed over the pixel layer of a display screen.

FIG. 8A shows a top view (i.e., a view from the viewer side of the display screen) of an example blur layer made with an example random bead layer 802 and placed adjacent to the pixel layer 806 on the viewer side of the display screen. The random bead layer 802 of the blur layer includes a layer of uniformly but randomly (or pseudo-randomly) distributed small transparent beads 804 (e.g., glass beads) embedded in a thin, transparent, carrier substrate. The transparent beads 804 have curved surfaces (e.g., spherical surfaces) that refract and diffuse the light emitted from the sub-pixels of the display screen. The surfaces of the beads provide the distribution of curved refractive surfaces needed to diffuse the light emitted by the pixel layer, and suppress the high spatial frequencies (e.g., spatial frequencies greater than $1/(0.5W)$, W being the pixel pitch of the display screen) in the light, while preserving the low spatial frequencies (e.g., spatial frequencies less than $1/(6W)$). The distribution of beads (and their curved refractive surfaces) is substantially uniform (with respect to density, but not position) across the entire display region of the display screen (or a unit of the display screen if multiple tile units form the entire display screen), but is non-periodic with respect to at least spatial frequencies greater than $1/(4W)$.

In some implementations, the radii of the beads 804 are equal to 55 microns to 75 microns (e.g., 60 microns, 65 microns, or 70 microns). In some implementations, the size of the beads is kept below 1/10 of d/n, d being the distance between the random bead layer and the plane on the viewer side in which the boundaries of the sub-pixels are last defined, and n being the refractive index of the material between the random bead layer and the plane in which the boundaries of the sub-pixels (and pixels) are last defined. In some implementations, a single material (e.g., glass) fills the region between the random bead layer and the plane in which the boundaries of the sub-pixels (and pixels) are last defined. In some implementations, the space between the random bead layer and the plane in which the boundaries of the sub-pixels are last defined can be filled by multiple layers of different materials, including solid materials (e.g., glass, transparent plastics), liquid, gel, or gaseous materials (e.g., air).

In some implementations, the thin layer of uniformly and randomly distributed transparent beads 804 is spaced from the pixel layer by a distance d. The distance d can be measured from the plane in the pixel layer where the boundaries of the sub-pixels are last defined or enhanced, to the plane in the blur layer where the refraction of the light from the sub-pixels first occurs. For example, in the example display screen shown in FIG. 7, the plane where the boundaries of the sub-pixels (and pixels) are last defined or enhanced is the side of the color filter layer 510 that faces the viewer side of the display screen. The plane where the refraction of the light from the sub-pixel elements first occurs can be the side of the thin layer of random beads 804 that faces the excitation side of the display layer. For a given refractive index of the transparent beads 804, the diffusing power of the random bead layer 802 is substantially independent of the size of the transparent beads 804, provided that the size (e.g., diameter) of the transparent beads 804 is much smaller (e.g., at least 10 times smaller) than the distance d.

In some implementations, the blurring power of the blur layer can be approximated by a point spread function (PSF). The point spread function has a characteristic PSF width H. Applying a blur layer to an image can be approximated by a process of replacing each point in the image by a disk of diameter H, the disk having the same color and total power as the point, and then summing the effects of all the overlapping disks (i.e., convolving the image with the PSF). For beads 804 having a refractive index of 1.8-1.9, the PSF width H of the random bead blur layer 802 is approximately 2d/n, provided that the size (e.g., diameter) of the transparent beads 804 is much smaller (e.g., at least 10 times smaller) than the distance d/n, where n is the refractive index of the material filling the gap between the two planes that define the distance d.

As set forth earlier in the specification, in order to reduce Moiré patterns formed by the interference between the spatial periodicities associated with the colored sub-pixels and the spatial periodicities associated with the light-sensing structures in the image capturing devices, the blur layer needs to suppress the spatial frequencies associated with the spatial periodicities of the sub-pixel level spatial features, while preserving the spatial frequencies associated with the pixel-level features in the image. When light emitted by the sub-pixels in the pixel layer pass through the blurring layer, the blur layer serves as a low-pass filter that removes the high spatial frequencies associated with the sub-pixel level spatial features. In order to balance the tradeoff between removing the spatial frequencies associated with sub-pixel level spatial features, and keeping the pixel-level resolution, the blurring power of the blur layer is chosen from within a range such that the blur layer only suppresses spatial frequencies above a selected value but preserves spatial frequencies below the selected value (or below another value less than the selected value).

In some implementations, the blur layer is configured to suppress at least spatial frequencies that are greater than 1/(0.5W) and preserve at least spatial frequencies that are less than 1/(2W) in images formed by the light emitted by the sub-pixel elements, where W represents the width of a pixel in the display screen.

For example, if the blurring power of the blur layer is chosen to be H=0.5W, the blur layer will suppress the spatial frequencies that are above 1/(0.5W), but preserve spatial frequencies that are equal or below 1/(0.5W). Such a blur layer preserves the pixel level resolution of the images produced by the pixel layer, however, some spatial periodicities of the sub-pixels may still remain in the light that pass through the blur layer. Moiré patterns may still be produced, although to a lessened extend, due to the spatial periodicities that are not removed from the light emitted from the sub-pixels before the light reaches the periodic light-sensing structures of a digital image capturing device.

For another example, if the blurring power of the blur layer is chosen to be H=2W, the blur layer will suppress the spatial frequencies that are above 1/(2W), but preserve spatial frequencies that are equal or below 1/(2W). Such a blur layer removes more of the spatial frequencies associated with the sub-pixels, and thus is more effective in reducing Moiré patterns. However, the blur layer also removes some of the pixel-level image information, and causes some deterioration in image resolution and quality.

For another example, if the blurring power of the blur layer is chosen to be H=W, the blue layer will substantially suppress the spatial frequencies that are above 1/W, but preserve the spatial frequencies that are equal or less than 1/W. The blurring power close to H=W represents a good balance between the Moiré reduction and preservation of image resolution.

The range from which the blurring power can be chosen is a design parameter that may vary depending on the emphasis placed on Moiré reduction versus image resolution in particular applications. In some implementations, the blurring power is chosen from the range of H=0.75W to H=1.25W. When the blurring power of the blur layer is chosen from this range, the blur layer is configured to suppress at least spatial frequencies that are greater than 1/(0.75W) and preserve at least spatial frequencies that are less than 1/(1.25W) in the images formed by the light emitted by the sub-pixel elements in the periodic array of pixel elements. Other ranges from which the blurring power of the blur layer can be chosen from are possible.

For another example, in implementations where the light-emitting pixel elements are substantially smaller than the pixel pitch of the display screen, periodic sub-pixel level spatial features are provided by the boundaries of the pixel elements themselves (e.g., in addition to the boundaries of the sub-pixel elements within the pixel elements). In such cases, it is sometimes desirable to sacrifice some pixel-level resolution in favor of Moiréreduction. In addition, an added advantage of sacrificing some pixel-level resolution is that the fill-factor of the pixels may be increased, and the overall image of the display screen may appear smoother and less pixilated.

In some implementations, the blur layer is configured to suppress at least spatial frequencies that are greater than 1/(1.5W) and preserve at least spatial frequencies that are less than 1/(6W) in the images formed by the light emitted by the pixel elements in the periodic array of light-emitting pixel elements. This range is suitable for small pixel elements in a display screen with a low fill factor (e.g., the ratio between the dimension of the light-emitting pixel element in a particular direction and the pixel pitch in the particular direction).

In some implementations, the range can be adjusted to preserve more of the pixel-level spatial frequencies. For example, the blur layer can be configured to suppress at least spatial frequencies that are greater than 1/(1.5W) and preserve at least spatial frequencies that are less than 1/(2W) in the images formed by the light emitted by the pixel elements in the periodic array of light-emitting pixel elements.

Figure 8B:
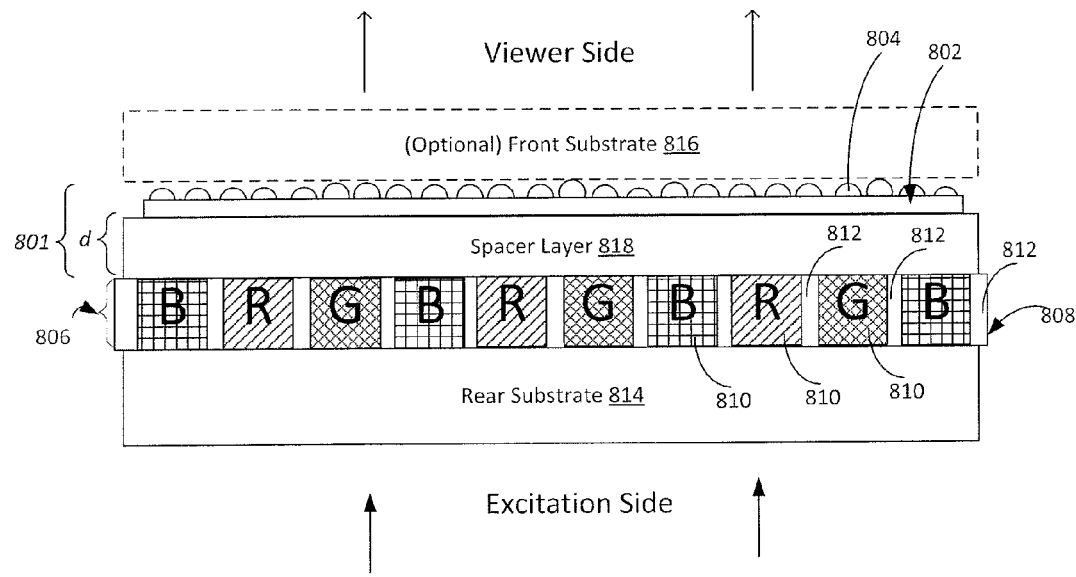

FIG. 8B shows a side view of an example configuration of a display screen having a blur layer 801. In this example configuration, the pixel layer 806 includes a light-emitting layer 808 comprising colored light-emitting elements 810 (e.g., red, blue, and green fluorescent stripes), each colored light-emitting element 810 defines the boundaries of a respective colored sub-pixel. The colored light-emitting elements 810 are optionally separated by opaque dividers 812 (e.g., opaque stripe dividers). In the example configuration shown in FIG. 8B, the boundaries of light-emitting sub-pixels are defined in the light-emitting layer 808, and no additional layer on the viewer side of the display screen further defines or enhances the boundaries of the sub-pixels. Therefore, the light-emitting layer 808 constitutes the pixel layer 806 of the display screen. The blur layer 801 includes a diffusing layer (e.g., a random bead layer 802) that is spaced (e.g., by a spacer layer 818) from the pixel layer 806 by a distance d. The spacer layer 818 and the random bead layer 802 together form the blur layer 801 of the display screen. The distance d is measured from the side of the light-emitting layer 808 facing the viewer side, to the side of the blur layer 802 facing the excitation side. The distance d, as well as the refractive index of the material filling the gap between the two planes defining the distance d, also affects the blurring power of the blur layer

802. In some implementations, the distance d is chosen to be 0.9 mm when the spacer layer 818 is made of CF glass (e.g., refractive index n=1.5), to achieve a blurring power of H=1.2 mm=2d/n. In some implementations, the spacer layer 818 is a monolithic or multi-layered structure that does not substantially affect the direction and intensity of the light emitted from the pixel layer 806, as the light passes through the spacer layer 818.

In some implementations, a rear substrate 814 is placed adjacent to the light-emitting layer 808 on the excitation side, while an optional front substrate 816 is placed adjacent to the random bead layer 802 on the viewer side. Each of the rear substrate 814 and the optional front substrate 816 can be a multi-layer substrate supporting various functions. For example, the rear substrate 814 can include layers for enhancing the excitation light or coupling the excitation light to the light-emitting layer 808. The optional front substrate 816 can include a layer that blocks the excitation light from exiting the front substrate 816 into the viewer side of the display screen. In some implementations, the optional front substrate 816 can also include a contrast enhancement layer that reduces the reflection of ambient light into the viewer side. The contrast enhancement layer can be a neutral density filter, for example. In some implementations, the neutral density filter can be incorporated into the substrate in which the random beads are embedded. In some implementations, the neutral density filter is a separate layer between the random bead layer and the pixel layer, and forms part of the spacer layer. In some implementations, the optional front substrate 816 is included to protect the blur layer. In some implementations, an anti-reflection coating can be applied to the surface of the front substrate to reduce loss of light intensities through the front substrate 816.

Figure 8C:
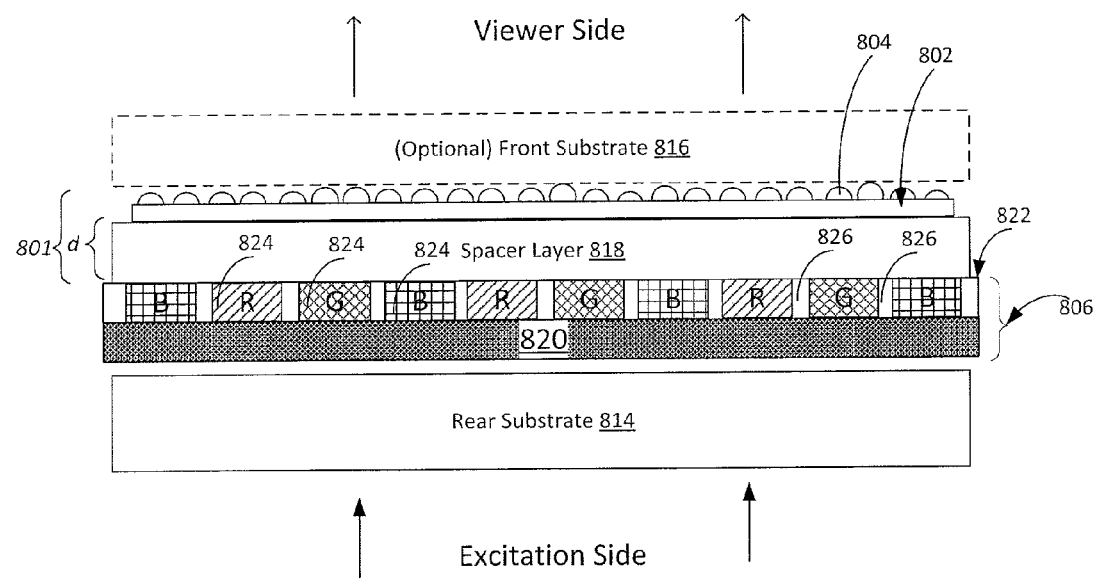

FIG. 8C shows a side view of another example configuration of a display screen having a blur layer 801 made with a random bead layer 802 and a spacer layer 818. In FIG. 8C, the pixel layer 806 includes a uniform layer of fluorescent material (e.g., fluorescent layer 820) that emits broad spectrum light of multiple color components when irradiated by the scanning excitation beam. The pixel layer 806 further includes a color filter layer 822 which includes a plurality of parallel, colored filter stripes 824 (e.g., the color filter layer 510 shown in FIG. 7). Each colored filter stripe 824 is configured to absorb a respective portion of an emission spectrum of the fluorescent layer 820 and let through light of a respective color. For example, a red color filter stripe will absorb light of blue and green colors, and will let through only light of the red color. Each colored filter stripe 824 and a portion of the fluorescent layer 820 adjacent to the colored filter stripe 824 form a respective light-emitting stripe of the pixel layer 806, and a respective boundary of the colored filter stripe 824 defines a respective boundary of a light-emitting sub-pixel of the display screen. Optionally, the colored filter stripes 824 are separated by opaque stripe dividers 826.

In the example configuration shown in FIG. 8C, beyond the color filter layer 822, no additional layer on the viewer side of the display screen further defines or enhances the boundaries of the light-emitting sub-pixels. Therefore, the color filter layer 822 is the last layer on the viewer side that defines or enhances the boundaries of the sub-pixels. The distance d between the diffusing layer (e.g., the random bead layer 802) and the pixel layer 806 is thus measured from the side of the filter layer 822 that faces the viewer side, to the side of the diffusing layer (e.g., the random bead layer 802) that faces the excitation side. The spacer layer 818 fills the gap between the filter layer 822 and the diffusing layer (e.g., the random bead layer 802). The distance d, as well as the refractive index of the material filling the gap between the two planes defining the distance d, also affects the blurring power of the blur layer 802. In some implementations, the distance d is chosen to be 0.9 mm when the spacer layer 818 is made of CF glass, to achieve a blurring power of H=1.2 mm.

Although the color filter stripes 824 shown in FIG. 8C has an exaggerated thickness, in actual implementations, the color filter stripes 824 can be formed in a thin film, and the thin film is then laminated on a clear substrate (e.g., a substrate 702 shown in FIG. 7). The clear substrate can serve as all or part of the spacer layer 818 that separates the color filter stripes 824 and the diffusing layer (e.g., the random bead layer 802). If the clear substrate of the color filter stripes 824 does not have sufficient thickness, an additional spacer layer can be inserted between the clear substrate and the thin diffusing layer (e.g., the random bead layer 802). In some implementations, the random bead layer 802 can be laminated on a clear substrate, and the clear substrate of the random bead layer 802 and the clear substrate of the color filter stripes 824 together make up the thickness of the spacer layer 818. The spacer layer 818 and the diffusing layer (e.g., the random bead layer) together form the blur layer 801 for Moiré reduction.

In some implementations, a rear substrate 814 is placed adjacent the fluorescent layer 820 on the excitation side, while a front substrate 816 is placed adjacent the blur layer 802 on the viewer side. Each of the rear substrate 814 and the front substrate 816 can be a multi-layer substrate supporting various functions. For example, the rear substrate 814 can include layers for enhancing the excitation light or coupling the excitation light to the fluorescent layer 820. The front substrate 816 can include a layer that blocks the excitation light from exiting the front substrate 816 into the viewer side of the display screen. In some implementations, the front substrate 816 can also include a contrast enhancement layer that reduces the reflection of ambient light into the viewer side. The contrast enhancement layer can be a neutral density filter, for example.

Figure 8D:
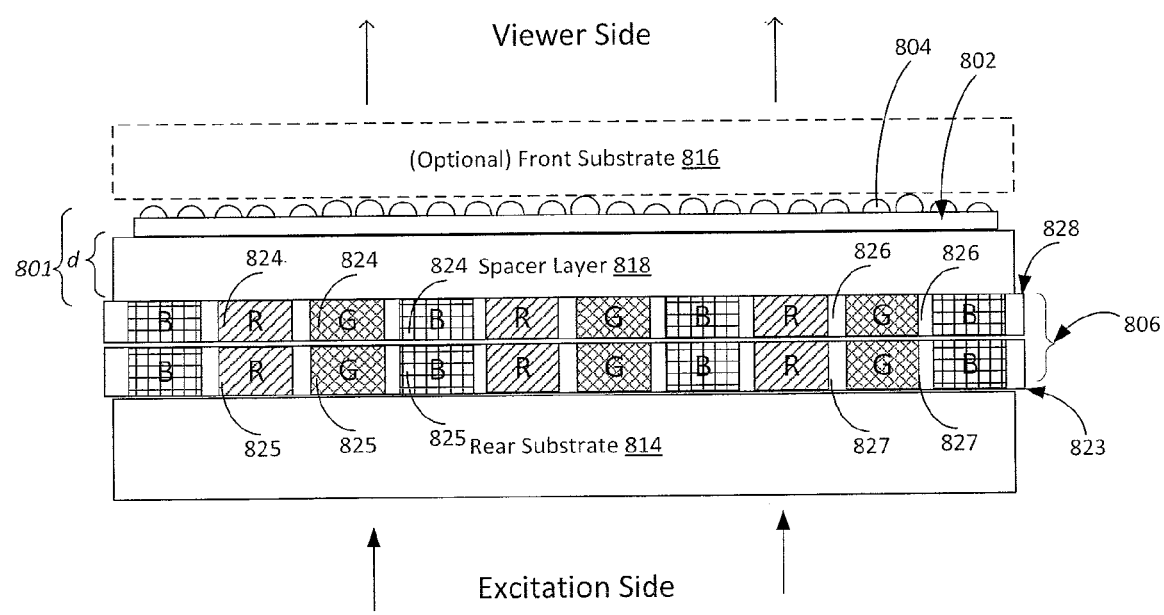

FIG. 8D shows an example configuration of a display screen having a blur layer 801 for Moiré reduction. The blur layer 801 includes a diffusing layer made of a random bead layer 802. The blur layer 801 also includes a spacer layer 818 that separates the pixel layer 806 of the display screen from the diffusing layer of the blur layer 801. In this example configuration, the pixel layer 806 includes both colored light-emitting elements (e.g., colored fluorescent stripes 825 optionally separated by stripe dividers 827) in a light-emitting layer (e.g., florescent layer 823), and contrast enhancing elements (e.g., contrast enhancement filter stripes 824 optionally separated by stripe dividers 826) in a contrast enhancement layer 828. The boundaries of colored sub-pixels are first defined in the light-emitting fluorescent layer 823 by the physical boundaries of the colored florescent stripes. The boundaries of the colored sub-pixels are then enhanced in the contrast enhancement layer 828 by the boundaries of the contrast enhancement elements (e.g., the contrast enhancement filter stripes 824). Each contrast enhancement filter stripe 824 is aligned with a respective light-emitting florescent stripe of the same color, and the contrast enhancement filter stripe 824 helps to prevent scattered light from neighboring florescent stripes from washing out the boundaries of the sub-pixel defined by the fluorescent stripe. In this example configuration, the contrast enhancement layer 828 is the last layer on the viewer side that defines or enhances the boundaries of the sub-pixels. Therefore, the distance d is measured from the side of the contrast enhancement layer 828 the faces the viewer side, to the side of the diffusing layer (e.g., the random bead layer 802) that faces the excitation side.

A spacer layer 818 of thickness d can be placed between the contrast enhancement layer 828 and the diffusing layer (e.g., the thin random bead layer 802). The spacer layer 818 can be a unitary layer that does not substantially affect the directions and intensities of the light pass through the spacer layer 818 from the pixel layer 808 to the diffusing layer (e.g., the random bead layer 802). For example, the spacer layer 818 can include the clear substrates on which the random bead layer 802 and the color filter stripes 824 are laminated. Alternatively, in some implementations, the spacer layer 818 can be a neutral density filter that helps to reduce the reflection of ambient light back into the viewer side. The neutral density filter serves to enhance the contrast between the different colored sub-pixels by reducing the reflection of ambient light back to the viewer side.

In some implementations, the built-in Moiré reduction structures described above can be implemented in conjunction with additional structures that reduces reflection of incident ambient light by the screen layers. The display screens having these addition screen structures can have a darker appearance because the additional structures absorb incident ambient light that come from the viewer side of the display screen as well as reflected ambient light that come from other screen layers, such that less of the incident ambient light returns to the viewer side and becomes captured by an image capturing device.

Although in the above examples, display screens having light-emitting pixel elements formed of florescent stripes are described, the blur layer can be used for display screens utilizing other types of light-emitting pixel elements and/or sub-pixel elements. In some implementations, the pixel layer of a display screen (e.g., an LED display, or LED wall) includes light-emitting pixel elements (e.g., full-color LEDs) arranged in a periodic array (e.g., in a square, triangular, hexagonal, or other lattice pattern) with a pixel pitch W. The light-emitting pixel elements each can have a physical dimension a that is smaller than the pixel pitch W, and the periodic array of pixel elements can themselves generate sub-pixel level spatial frequencies. In addition, due to the low fill factor of the pixel layer, significant amount of Moiré patterns can be created due to the pixel-level spatial frequencies of the pixel elements. In such cases, the blur layer can be disposed adjacent to the pixel layer containing the light-emitting pixel elements, and suppress the sub-pixel level spatial frequencies (e.g., spatial frequencies at or above 1/W), as well as some pixel-level spatial frequencies (e.g., the spatial frequencies between 1/W and 1/(1.5W)). The blur layer can preserve spatial frequencies below 1/(2W) or 1/(6W), or another value in between to maintain reasonable resolution of the display screen.

Although in the above examples, each pixel element includes an identical spatial arrangement of sub-pixel elements as other pixel elements, in some implementations, two adjacent pixel elements may have different spatial arrangements for their constituent set of sub-pixel elements. In addition, two or more adjacent pixel elements may share one or more common sub-pixel elements. For example, in some implementations, each pixel element can include 2 red sub-pixel elements, 1 green sub-pixel element, and 1 blue sub-pixel element arranged in a 2×2 square lattice. The 2 red sub-pixel elements are arranged in a diagonal of the 2×2 square lattice. The arrangements of sub-pixel elements in each pair of vertically adjacent pixel elements are also mirror images of each other in the vertical direction. The arrangements of sub-pixel elements in each pair of horizontally adjacent pixel elements are mirror images of each other in the horizontal direction. Therefore, each sub-pixel element in the pixel layer is shared by four adjacent pixels arranged in a square lattice. By sharing the sub-pixel elements, the resolution of the display screen can be increased four-fold without increasing the overall size of the display screen or shrinking the size of the sub-pixel elements. The boundaries of the pixel elements are dynamically generated when each sub-pixel element is activated (or kept unlit) according to the color compositions of the pixel elements sharing that sub-pixel element.

Regardless of the arrangements of the sub-pixel elements in the pixel elements of a display screen, or whether the boundaries of the pixel elements and/or sub-pixel elements are physical boundaries or dynamically generated virtual boundaries, the blur layer can be placed on the pixel layer to suppress the higher spatial frequencies apposite to generating Moiré patterns while preserving as much as the low spatial frequencies to maintain image resolution.

A display screen that reduces reflection of incident ambient light can be preferable in a broadcast environment where images on the display screen are captured together with other objects around the display screen by one or more image capturing devices. For example, various special lights may be used in a broadcast studio to achieve the desired appearance for objects or people that are being filmed by a digital video camera. The light emanating from these various lights and the light reflected off of other objects and people surrounding the display screen (or collectively, the ambient light) can enter the display screen from the viewer side, and be reflected back by the display layers inside the display screen. The reflected ambient light can be captured by the image capturing devices, and produce undesirable artifacts (e.g., reflections of the crew, equipment, lights, etc.) in the images formed in the image capturing devices. Therefore, it would be desirable if the display screen absorbs the incident ambient light rather than reflects it, and/or if the reflected ambient light is attenuated before it exits the display screen to viewer side. With the reduction of ambient light reflection, when the display screen is captured together with other objects and people, the display screen has a dark and uniform appearance substantially free of the visual artifacts produced by the reflected ambient light.

Figure 9A:
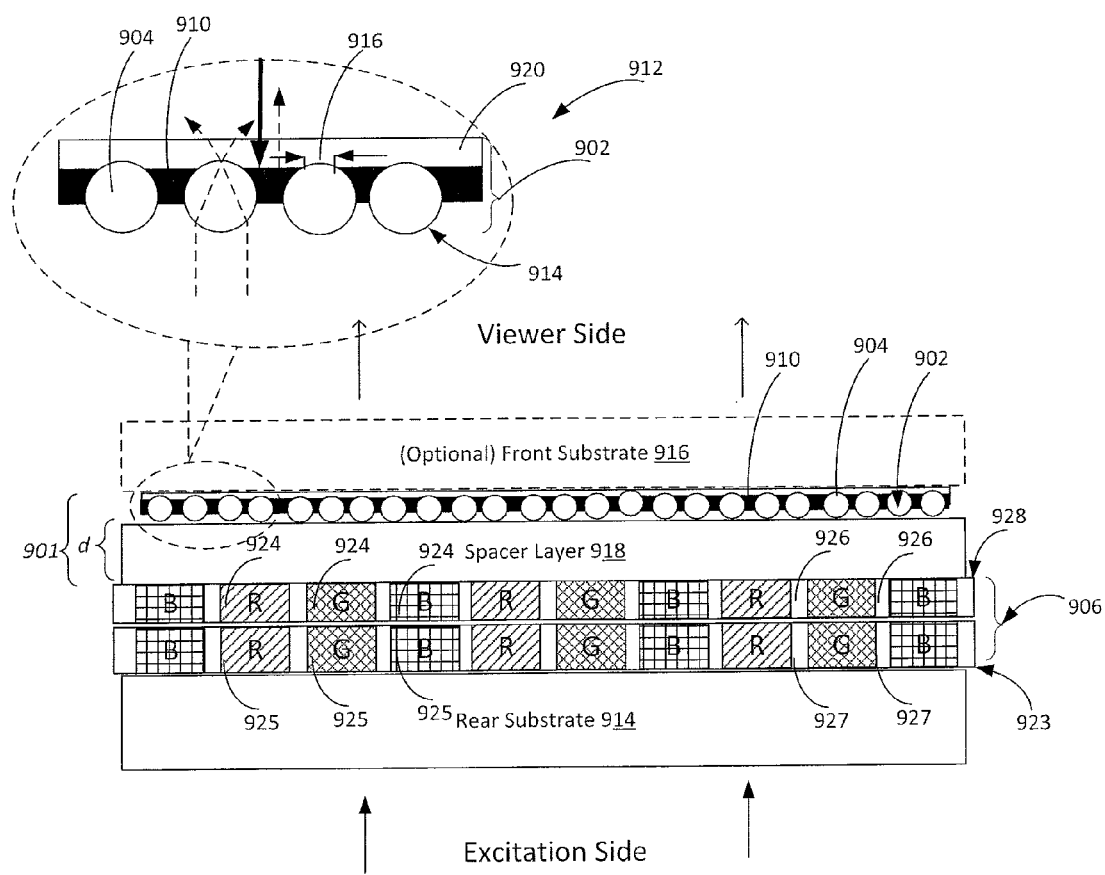
FIGS. 9A-9C illustrate a few example screen configurations that include a "dark-screen" layer in combination with a blur layer.
Figure 9B:
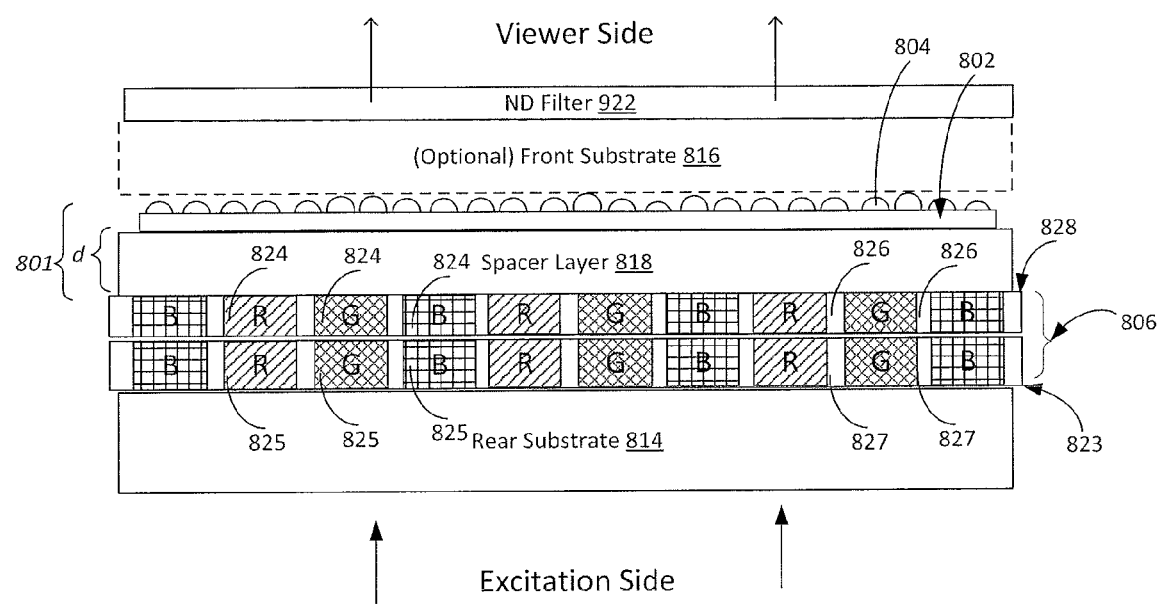
Figure 9C:
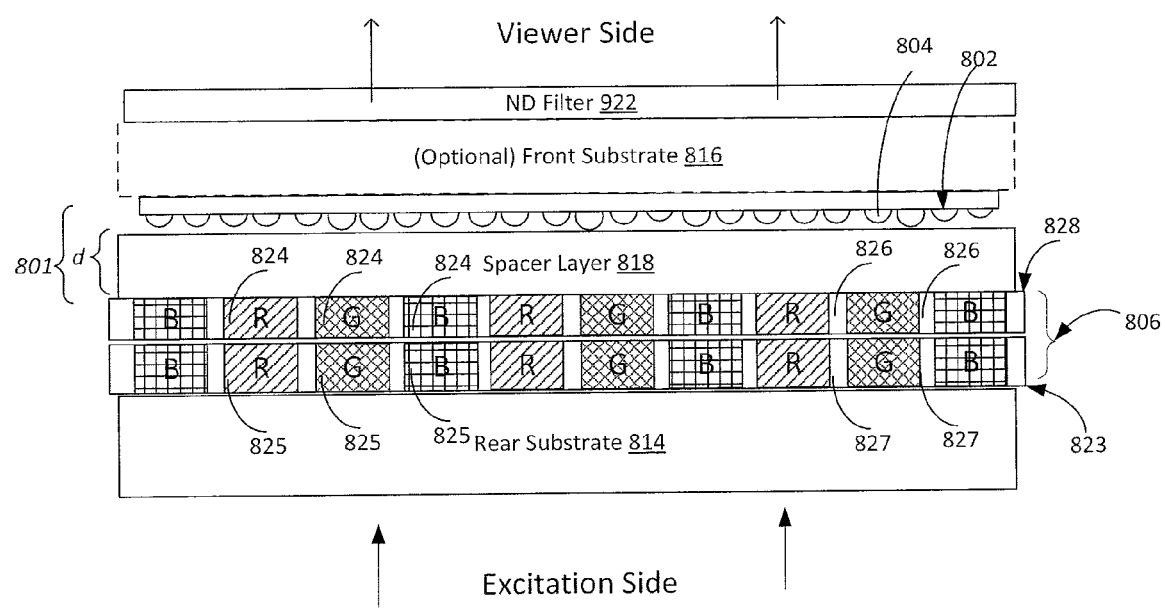

FIGS. 9A-9C illustrate example configurations where additional structures are built into the display screen to reduce reflection of ambient light, and produce a darker display background. These additional structures can be implemented as part of the Moiréreducing blur layer, or as a different layer from the Moiré reduction layer.

In FIG. 9A, a display screen includes a blur layer 901 and a pixel layer 906. The pixel layer 906 includes the last layer on the viewer side in which the boundaries of colored sub-pixels (and/or boundaries light-emitting pixel elements) of the display screen are defined or enhanced. The blur layer 901 is placed adjacent to the pixel layer 906 on the viewer side of the pixel layer 906. In this particular example, the pixel layer 906 includes a fluorescent layer 923 and a contrast enhancing color filter layer 928. The fluorescent layer 923 includes colored fluorescent stripes 925 (e.g., red, green, and blue fluorescent stripes) defining the boundaries of the sub-pixels in at least the dimension across the stripes. The contrast enhancing color filter layer 928 includes colored filter stripes 924 that are aligned with the corresponding colored fluorescent stripes 925 underneath. The colored fluorescent stripes 925 are optionally separated by stripe dividers 927. The colored filter stripes 924 are optionally separated by stripe dividers 926.

The blur layer 901 includes a random bead layer 902 and a transparent spacer layer 918. The random bead layer 902 and the transparent spacer layer 918 together produces the desired amount of blurring to suppress the sub-pixel level spatial frequencies, while preserving the pixel level spatial frequencies in the light emitted by the fluorescent stripes 825 through the contrast enhancing colored filter stripes 924.

In contrast to the configuration shown in FIG. 8D, the random bead layer 902 of the blur layer 901 includes randomly (or pseudo-randomly) distributed glass beads partially embedded in a light absorbing material 910. As set forth above, the distribution of the glass beads only need to be locally non-periodic, e.g., non-periodic with respect to spatial frequencies of greater than 1/(4W). The light absorbing material 910 can be substantially absorbent to visible light of all colors, such that when visible ambient light is incident on the light absorbing material 910, none or only a small fraction of incident visual ambient light can pass through the layer of absorbing material 910 and/or get reflected back to the viewer side.

As shown in the enlarged view 912 of the random bead layer 902, in contrast to the random bead layers 802 shown in FIGS. 8B-8D, the un-embedded refractive surfaces 914 of the randomly distributed glass beads 904 curve toward the excitation side of the display screen in this example screen layer configuration. In addition, the embedded side of each glass bead 904 protrudes beyond the layer of light absorbing material 910 by a small amount on the viewer side, such that a small light-transmitting aperture 916 is formed on the viewer side of the light-absorbing material 910. The small apertures 916 allow light emitted by the light-emitting elements (e.g., the colored fluorescent stripes 925) in the pixel layer 906 to pass through onto the viewer side of the display screen. In some implementations, the light absorbing material 910 including the partially embedded glass beads 904 is laminated on a clear substrate 914. In some implementations, the un-embedded refractive surfaces 914 can be coated by a thin layer of transparent material to better couple light received from the pixel layer 806 into the viewer side.

As shown in the enlarged view 912, the glass beads 904 embedded in the layer of light-absorbing material 910 protrudes from the layer of light-absorbing material 910 on both the viewer side and the excitation side. The exposed refractive surface of each glass bead 904 is larger on the excitation side than on the viewer side of light absorbing material 910. For example, the larger exposed refractive surface on the excitation side can be a dome surface having a base with a diameter approximately the same as the diameter of the glass beads (e.g., 55-75 microns), while the smaller exposed refractive surface (i.e., the apertures) on the viewer side is a dome surface having a base with a diameter that is a fraction (e.g., less than half) of the diameter of the glass beads (e.g., 20-30 microns). The orientation of the random bead layer is chosen this way to increase the viewing angle of image light that passes through the random bead layer 902 onto the viewer side, and at the same time absorbs more of the ambient light that comes from the viewer side.

Because the diameters of the apertures 916 are smaller than the diameter of the glass beads 904, the diffusing power of the refractive surfaces inside the aperture is smaller as compared to the diffusing power of the glass beads 804 in configurations shown in FIGS. 8B-8D. To compensate for the reduced diffusing power of the random bead layer 902 while maintaining the same amount of blurring, the thickness d of the spacer layer 918 is increased, as compared to the thickness of the spacer layer 818 in the configurations shown in FIGS. 8B-8D. Although the spacer layer 918 appears to be a unitary transparent layer in FIG. 9A, in various implementations, the spacer layer 918 can also be made up by more than one layer. For example, the spacer layer 918 can include a transparent substrate layer on which the colored filter layer 928 is laminated and an additional transparent layer to make up any the necessary thickness d of the spacer layer 918. In some implementations, the apertures 912 formed in the light absorbing layer 910 have radii of approximated 20-30 microns, and the total effective thickness of the spacer layer is about 3 millimeters (e.g., 3.1 mm).

In some implementations, a rear substrate 914 is placed adjacent the fluorescent layer 923 on the excitation side, while a front substrate 916 is optionally placed adjacent the random bead layer 902 on the viewer side. In some implementations, the random bead layer 902 itself is laminated on a clear substrate layer 920, and the front substrate 916 can be placed adjacent to the clear substrate layer 920 on which random bead layer 902 is laminated. Each of the rear substrate 914 and the front substrate 916 can be a multi-layer substrate supporting various functions. For example, the rear substrate 914 can include layers (e.g., a Fresnel lens layer) for enhancing the excitation light or coupling the excitation light to the fluorescent layer 923. The front substrate 916 can include a layer that blocks the excitation light from exiting the front substrate 916 into the viewer side of the display screen. In some implementations, the front substrate 916 can also include a neutral density filter that further reduces the reflection of ambient light into the viewer side.

Although the example configuration shown in FIG. 9A uses a pixel layer 906 that includes a fluorescent layer 923 and a contrast enhancing color filter layer 928, pixel layers of other configurations can be used as well. For example, the pixel layers described in the descriptions accompanying FIGS. 8B and 8C can also be used to replace the pixel layer 906 shown in FIG. 9A.

In some implementations, the reduction of ambient light reflection can be accomplished with a neutral density filter placed on the viewer side of the random bead layer, without the use of a light absorbing material in the random bead layer. As shown in FIG. 9B, the example display screen includes the same components as the display screen shown in FIG. 8C, except that a neutral density filter 922 is placed on the viewer side of the random bead layer 802. When ambient light enters the display screen from the viewer side, it will pass the neutral density filter 922 and be attenuated. When the attenuated ambient light gets reflected by other layers of the display screen and goes through the neutral density filter 922 again, the reflected ambient light will be further attenuated. Thus, the reflected ambient light that exits the display screen to the viewer side would be significantly reduced.

Since the neutral density filter 922 will attenuate not only the ambient light that passes through it, but also the light emitted by the light emitting pixels of the pixel layer 806, the neutral density filter 922 will decrease the brightness of the images produced by the display screen. However, since the brightness requirement of a display screen to be captured by an image capturing device used in a broadcast studio is generally lower than the display screen for normal viewing, the reduced brightness due to the added neutral density filter 922 would not significantly impact the performance of the display screen in a broadcasting context.

In some implementations, the thickness of the neutral density filter and the attenuation factor of the neutral density filter can be adjusted to achieve maximum attenuation of the ambient light reflection, while maintain at least the minimum brightness required of the display screen. In some implementations, for a display screen with an un-attenuated brightness of 600-1000 nits, the neutral density filter can reduce the brightness to a level as low as 100 nits, and essentially remove 80-90% of the ambient light reflections.

FIG. 9C shows a variation of the screen layer configurations shown in FIG. 9B. In FIG. 9C, the screen layer configuration is essentially the same as that shown in FIG. 9B, except that the random bead layer 802 of the blur layer 801 is reversed in direction, and the protruding refractive surfaces of the glass beads now faces the excitation side of the display screen. In this configuration, the blurring of the sub-pixel boundaries is accomplished by the combination of the refractive surfaces of the glass beads 804 and the spacer layer 818. In some implementations, the spacer layer 818 can be an air gap (e.g., n=1). In some implementations, the spacer layer 818 can include both an air gap of thickness x (x<d) and a layer of transparent substrate material of thickness y=(d−x).

As shown in FIG. 9C, the display screen shown in FIG. 9C also includes a neutral density filter 922 placed on the viewer side of the random bead layer 802. When ambient light enters the display screen from the viewer side, it will pass the neutral density filter 922 and be attenuated. When the attenuated ambient light gets reflected by other layers of the display screen and goes through the neutral density filter 922 again, the reflected ambient light will be further attenuated. Thus, the reflected ambient light that exits the display screen to the viewer side would be significantly reduced.

Although the example configurations shown in FIGS. 9B and 9C uses a pixel layer 806 that includes a fluorescent layer 823 and a contrast enhancing color filter layer 828, pixel layers of other configurations can be used as well. For example, the pixel layers described with respect to FIGS. 8B and 8C can also be used to replace the pixel layer 806 shown in FIGS. 9B and 9C.

While this document contains many specifics, these should not be construed as limitations on the scope of an invention or of what may be claimed, but rather as descriptions of features specific to particular embodiments of the invention. Certain features that are described in this document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or a variation of a subcombination.

Only a few implementations are disclosed. However, variations and enhancements of the described implementations and other implementations can be made based on what is described and illustrated in this document.

What is claimed is:

1. A display screen, comprising:
a pixel layer comprising a periodic array of light-emitting pixel elements, the periodic array having a pixel pitch of W along at least one direction and operable to emit visible light toward a viewer side of the display screen; and
a blur layer disposed adjacent to the pixel layer on the viewer side of the display screen relative to the pixel layer, the blur layer configured to diffuse light emitted by the pixel elements in the periodic array of light-emitting pixel elements, and to suppress spatial frequencies that are greater than a threshold frequency and preserve spatial frequencies that are equal or less than the threshold frequency in images formed by the light emitted by the pixel elements in the periodic array of light-emitting pixel elements, the threshold frequency being greater than 1/W such that spatial frequencies that are greater than 1/W but equal to or less than the threshold frequency are preserved.

2. The display screen of claim 1, wherein:
respective boundaries of the light-emitting pixel elements form spatially periodic linear features having one or more spatial frequencies greater than 1/W.

3. The display screen of claim 2, wherein:
respective sizes and spatial configuration the spatially periodic linear features are apposite to form Moiré patterns when images presented on the display screen are captured by a periodic light-sensing structure in an image capturing device; and
the blur layer in the display screen reduces formation of the Moiré patterns when images presented on the display screen are captured by the periodic light-sensing structure in the image capturing device.

4. The display screen of claim 1, wherein:
each of the the light-emitting pixel elements includes a respective set of multiple sub-pixel elements, the respective set of multiple sub-pixel elements each configured to emit light of a respective sub-pixel color, and respective boundaries of the sub-pixel elements of each sub-pixel color in the periodic array form spatially periodic linear features having one or more spatial frequencies greater than 1/W; and
the blur layer is configured to suppress at least spatial frequencies that are greater than 1/(0.5W) in the images formed by the light emitted by the pixel elements in the periodic array of light-emitting pixel elements.

5. The display screen of claim 1, wherein each light-emitting pixel element in the periodic array shares at least one light-emitting sub-pixel element with one or more adjacent light-emitting pixel elements in the pixel layer.

6. The display screen of claim 1, wherein each light-emitting pixel element in the periodic array includes an identical set of multiple sub-pixel elements.

7. The display screen of claim 6, wherein a respective boundary of each sub-pixel element includes at least in part a physical boundary separating a light-emitting region from a non-light-emitting region.

8. The display screen of claim 6, wherein a respective boundary of each sub-pixel element includes at least in part a virtual boundary separating a first light-emitting region of a first color from a second light-emitting region of a second color.

9. The display screen of claim 6, wherein a respective boundary of each light-emitting pixel element comprises at least in part a physical boundary separating a light-emitting region from a non-light-emitting region.

10. The display screen of claim 6, wherein a respective boundary of each light-emitting pixel element comprises at least in part a virtual boundary separating a light-emitting region from a non-light-emitting region.

11. The display screen of claim 1, wherein:
the periodic array of light-emitting pixel elements comprises a plurality of parallel light-emitting stripes each configured to emit light of a respective color and form a respective colored sub-pixel element of the display screen when irradiated by a scanning excitation beam on an excitation side of the pixel layer opposite to the viewer side.

12. The display screen of claim 1, wherein:
the pixel layer comprises a color filter layer;
the color filter layer includes a plurality of parallel, colored filter stripes, each colored filter stripe configured to absorb a respective portion of an emission spectrum of a fluorescent layer adjacent to the color filter stripe and let through light of a respective color to the viewer side of the display screen; and a respective boundary of each light-emitting pixel element is defined at least in part by a respective boundary of one of the plurality of colored filter stripes.

13. The display screen of claim 12, wherein:
the fluorescent layer comprises a layer of fluorescent material operable to emit broad spectrum light of multiple color components.

14. The display screen of claim 12, wherein:
the fluorescent layer comprises a layer of parallel, colored fluorescent stripes; and
each colored filter stripe and a respective one of the colored fluorescent stripes adjacent to the colored filter stripe form, at least in part, a respective light-emitting pixel element of the pixel layer when irradiated by a scanning excitation beam.

15. The display screen of claim 1, wherein:
the blur layer comprises a diffusing layer and a spacer layer adjacent to the diffusing layer;
the spacer layer is disposed adjacent to the pixel layer on the viewer side of pixel layer and couples light emitted by the light-emitting pixel elements in the pixel layer to the diffusing layer; and
the diffusing layer is disposed on a viewer side of the spacer layer and comprises a distribution of curved refractive surfaces that diffuse the light emitted by the light-emitting pixel elements, the distribution of the curved refractive surfaces is substantially uniform across an entire display region of the display screen, and locally non-periodic with respect to at least spatial frequencies greater than $1/(4W)$.

16. The display screen of claim 15, wherein:
the spacer layer is made of glass and has a thickness of approximately $W/2-2W$; and
the spacer layer is laminated on the pixel layer.

17. The display screen of claim 15, wherein:
the spacer layer comprises an air gap.

18. The display screen of claim 17, wherein:
the spacer layer includes at least one solid layer adjacent an air gap layer.

19. The display screen of claim 15, wherein the distribution of curved refractive surfaces comprises respective surfaces of a plurality of non-periodically distributed glass beads that protrude toward the viewer side of the display screen.

20. The display screen of claim 19, wherein:
the diffusing layer further comprises a layer of light-absorbing material, and the plurality of non-periodically distributed glass beads each protrudes from the layer of light-absorbing material on both sides of the layer of light absorbing material.

21. The display screen of claim 20, wherein:
each glass bead has a smaller refractive surface protruding beyond the layer of light-absorbing material toward the viewer side of the display screen and a larger refractive surface protruding beyond the layer of light-absorbing material toward a side of the display screen opposite to the viewer side.

22. The display screen of claim 21, wherein:
the larger refractive surface comprises a first dome having a base with a diameter of 55-75 microns;
the smaller refractive surface comprises a second dome having a base with a diameter of 20-30 microns; and
the spacer layer has a thickness of approximately 3 mm.

23. The display screen of claim 1, further comprising:
a neutral density filter disposed on the viewer side of the blur layer.

24. A display screen, comprising:
a pixel layer comprising a periodic array of pixel elements each having a pixel pitch W, the pixel elements each including an identical set of multiple sub-pixel elements positioned according to an identical layout, the multiple sub-pixel elements each configured to emit light of a distinct sub-pixel color to a viewer side of the display screen, and the sub-pixel elements of each sub-pixel color in the periodic array of pixel elements forming spatially periodic linear features; and
a blur layer disposed adjacent to the pixel layer on the viewer side of the display screen, the blur layer configured to diffuse the light emitted by the sub-pixel elements in the periodic array of pixel elements, and suppress spatial frequencies that are greater than a threshold frequency and preserve spatial frequencies that are equal or less than the threshold frequency in images formed by the light emitted by the sub-pixel elements in the periodic array of pixel elements, the threshold frequency being greater than $1/W$ such that spatial frequencies that are greater than $1/W$ but equal to or less than the threshold frequency are preserved.

25. A display screen, comprising:
a pixel layer comprising a plurality of fluorescent elements each configured to emit light of a respective color to a viewer side of the display screen and to form a respective colored sub-pixel of the display screen when irradiated by a scanning excitation beam on a first side of the pixel layer opposite to the viewer side of the display screen, the plurality of fluorescent elements forming identical spatial arrangements of multiple fluorescent elements of different sub-pixel colors, and the multiple fluorescent elements in each spatial arrangement forms a respective pixel of width W; and
a blur layer disposed adjacent to the pixel layer on the viewer side of the display screen, wherein the blur layer diffuses the light emitted by the plurality of fluorescent elements, and a blurring power of the blur layer is approximated by a point spread function (PSF) having a PSF width between $0.5W-2W$, and wherein the blur layer blurs boundaries between adjacent different colored sub-pixels and reduces formation of Moire patterns when images presented on the display screen are captured by a periodic light-sensing structure in an image capturing device.

26. A display screen, comprising:
a pixel layer comprising a plurality of parallel fluorescent stripes, each fluorescent stripe configured to emit light of a respective color to a viewer side of the display screen and to convey image information in a respective colored sub-pixel when irradiated by a scanning excitation beam on a first side of the pixel layer opposite to the viewer side of the display screen, the plurality of fluorescent stripes being arranged in identical sequences of multiple stripes of different colors, the respective colored sub-pixels provided by the multiple stripes in each sequence constituting a respective pixel of the display screen when the scanning excitation beam scans across the multiple stripes, and each pixel of the display screen having a pixel width of W; and
a blur layer disposed adjacent to the pixel layer on the viewer side of the display screen, wherein the blur layer diffuses the light emitted by the plurality of florescent stripes to blur boundaries between adjacent, different colored sub-pixels, while preserving pixel-level resolution of an image conveyed by the pixels of the display screen.

27. The display screen of claim 26, wherein:

the blur layer comprises a diffusing layer and a spacer layer adjacent to the diffusing layer;

the spacer layer is disposed adjacent to the pixel layer on the viewer side of pixel layer and couples light emitted by the fluorescent stripes in the pixel layer to the diffusing layer; and the diffusing layer is disposed on a viewer side of the spacer layer and comprises a distribution of curved refractive surfaces that diffuse the light emitted by the fluorescent stripes.

28. The display screen of claim 27, wherein the distribution of curved refractive surfaces comprises respective surfaces of a plurality of non-periodically distributed beads that protrude toward the viewer side of the display screen.

29. The display screen of claim 28, wherein the diameter of the beads is at least 10 times smaller than the distance between the diffusing layer and the pixel layer.

30. The display screen of claim 28, wherein the diameter of the beads is at least 10 times smaller than d/n, where d is the distance between the diffusing layer and the pixel layer, and n is the refractive index of the spacer layer.

31. The display screen of claim 28, wherein the beads are embedded in a transparent carrier substrate.

32. The display screen of claim 28, wherein the beads are made of glass.

* * * * *